United States Patent
Davis et al.

(10) Patent No.: US 12,356,040 B2
(45) Date of Patent: Jul. 8, 2025

(54) METHODS AND APPARATUS TO GENERATE MEDIA EXPOSURE MAPS OF MEDIA ENVIRONMENTS

(71) Applicant: The Nielsen Company (US), LLC, New York, NY (US)

(72) Inventors: Jeremey M. Davis, New Port Richey, FL (US); Ronny Lerch, San Antonio, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/621,089

(22) Filed: Mar. 28, 2024

(65) Prior Publication Data

US 2024/0244294 A1 Jul. 18, 2024

Related U.S. Application Data

(63) Continuation of application No. 18/079,723, filed on Dec. 12, 2022, now Pat. No. 11,962,850, which is a continuation of application No. 17/364,369, filed on Jun. 30, 2021, now Pat. No. 11,528,531.

(51) Int. Cl.
*H04N 21/442* (2011.01)
*H04N 21/466* (2011.01)

(52) U.S. Cl.
CPC ... *H04N 21/44218* (2013.01); *H04N 21/4667* (2013.01)

(58) Field of Classification Search
None
See application file for complete search history.

(56) References Cited

U.S. PATENT DOCUMENTS

| | | | |
|---|---|---|---|
| 9,826,359 B2 * | 11/2017 | Splaine | H04W 4/023 |
| 2005/0035857 A1 * | 2/2005 | Zhang | G06Q 30/02 455/2.01 |
| 2007/0266395 A1 * | 11/2007 | Lee | H04N 21/43615 348/E7.054 |
| 2008/0059988 A1 * | 3/2008 | Lee | H04N 21/44218 725/9 |
| 2009/0070797 A1 * | 3/2009 | Ramaswamy | H04N 21/4524 725/10 |
| 2014/0344841 A1 * | 11/2014 | Nielsen | H04H 60/33 725/10 |
| 2015/0052541 A1 * | 2/2015 | Chen | G01S 3/801 725/12 |
| 2019/0306572 A1 * | 10/2019 | Hardt | H04N 21/43615 |

* cited by examiner

*Primary Examiner* — Alexander Q Huerta

(57) ABSTRACT

Methods, apparatus, and systems are disclosed to generate media exposure maps of media environments. An example apparatus includes memory and processor circuitry to execute instructions to at least: group first locations into a first cluster and second locations into a second cluster, ones of the first locations and the second locations based on at least one of corresponding angle of arrival measurements or corresponding angle of departure measurements, determine a first duration corresponding to the first cluster and a second duration corresponding to the second cluster based on timestamps of the first locations and the second locations, and generate a map based on at least one of the first cluster or the second cluster in response to one of the first duration or the second duration meeting a threshold duration and corresponding to a monitored data, the map to represent an area of media exposure in a media presentation environment.

20 Claims, 13 Drawing Sheets

METHODS AND APPARATUS TO GENERATE MEDIA EXPOSURE MAPS OF MEDIA ENVIRONMENTS

CROSS REFERENCE TO RELATED APPLICATIONS

This patent arises from a continuation of U.S. patent application Ser. No. 18/079,723 (now U.S. Pat. No. 11,962, 850), which was filed on Dec. 12, 2022, which is a continuation of U.S. patent application Ser. No. 17/364,369 (now U.S. Pat. No. 11,528,531), which was filed on Jun. 30, 2021. U.S. patent application Ser. No. 17/364,369 and U.S. patent application Ser. No. 18/079,723 are hereby incorporated herein by reference in their entireties. Priority to U.S. patent application Ser. No. 17/364,369 and U.S. patent application Ser. No. 18/079,723 is hereby claimed.

FIELD OF THE DISCLOSURE

This disclosure relates generally to media environments, and, more particularly, to methods and apparatus to generate media exposure maps of media environments.

BACKGROUND

In recent years, media research efforts have included using installed metering hardware associating accessed media with panelists and/or other audience members that fit one or more demographics of interest. In some cases, the metering hardware is capable of determining whether a media presentation device (such as a television set) is powered on and tuned to a specified station via a hardwired connection from the media presentation device to the meter. In some cases, the metering hardware is capable of determining which panelist and/or other audience member is exposed to a particular portion of media via one or more button presses entered on a people meter by people near the television. Collected information from the different types of meters provides insight to the various factors influencing media consumption behavior habits of viewers.

BRIEF DESCRIPTION OF THE DRAWINGS

The figures are not to scale. In general, the same reference numbers will be used throughout the drawing(s) and accompanying written description to refer to the same or like parts.

Figure 1:
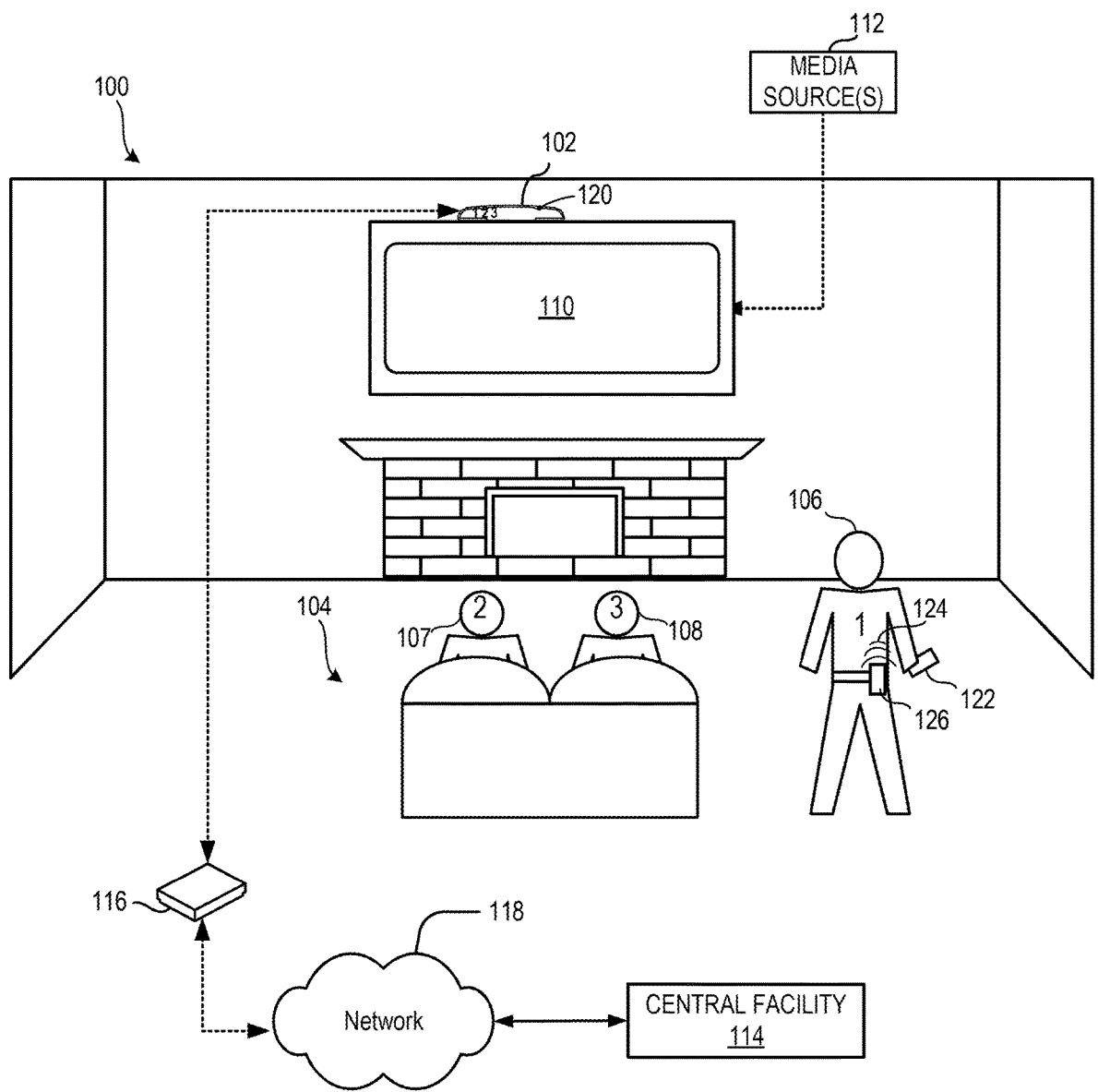
FIG. 1 is an illustration of an example audience measurement system having an example device meter to monitor an example media presentation environment.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Audience measurement entities and/or systems seek to understand the audience composition and/or size of media, such as radio programming, television programming, Internet media, etc., so that advertising prices may be established that are commensurate with audience exposure and/or demographic makeup (referred to herein collectively as "audience configuration"). As used herein, the term "media" includes any type of content and/or advertisement delivered via any type of distribution medium. Thus, media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

To determine aspects of audience configuration (e.g., which household member is currently watching a specified portion of media, the corresponding demographics of that household member, etc.), audience measurement entities and/or systems may perform audience measurement by enlisting a number of consumers as panelists. As used herein, panelists are users (e.g., audience members) registered on panels maintained by a ratings entity (e.g., an audience measurement company). An audience measurement entity and/or system typically monitors media consumption behaviors (e.g., tuning, viewing, etc.) of the enlisted audience members via audience measuring devices, such as metering devices, people meters, etc.

As described above, audience measurement entities may employ audience measuring devices, such as a personal meter (e.g., portable people meter, PPM), having a set of inputs (e.g., one or more user input buttons) that are each assigned to a corresponding member of a household. The personal meter captures information about the household audience by prompting the audience member(s) to indicate that they are present in the media exposure area (e.g., a living room in which a television set is present, etc.) during a media presentation by, for example, pressing their assigned input key on the personal meter. When a member of the household selects their corresponding input, the personal meter identifies which household member is present, and associates demographic information of the household member, such as a name, a gender, an age, an income category, etc. with the media presentation.

Another example of how audience measurement entities may employ audience measurement devices to collect household panelist behavior data is through the utilization of a device meter. Example device meters disclosed herein are distinguished from personal meters that include a physical input to be selected by a panelist household member actively consuming the media. In examples disclosed herein, device meters capture audio with or without a physical connection to the media presentation device. In some examples, device meters do not include one or more inputs for selection by one or more household panelists to identify which panelist is currently exposed to a media presentation by the media device. Rather than collecting audience composition data directly from panelists, example device meters impute which household members are exposed to (e.g., viewing) media programming in households with the device meter. For example, disclosed examples facilitate a manner of determining which panelist household members are exposed to media in a manner that avoids the need of additional personal meter input.

In some examples, a panelist household may include multiple media exposure environments. For example, a panelist household may include two or more rooms, where each room may include a media device such as a television, a computer, a radio, etc. In such an example, a device meter may be installed at each media device in each media exposure room. In some examples, it is beneficial to learn panelist behavior and generate audience composition data for each media exposure environment (e.g., room) in the panelist household to accurately assess where panelists are exposed to the media in the media exposure environment and where they are not exposed to the media. Knowing where the panelists are exposed to media in a media exposure environment can lend to more accurate crediting.

In examples disclosed herein, device meters and personal meters are configured to implement wireless protocols, such as Bluetooth®. In some examples, a device meter with a wireless protocol can determine when household members are exposed to (e.g., viewers of) media programming based on receiving a signal from a device (e.g., a mobile phone, a smart watch, etc.) implementing the wireless protocol and belonging to the household member. In some examples, the personal meter sends signals to the device meter via the wireless protocol, such as Bluetooth®, because the personal meter is configured to implement the wireless protocol, such as Bluetooth®. Bluetooth® is a wireless technology standard used for exchanging data between fixed and mobile devices over short distances using ultra high frequency (UHF) radio waves in the industrial, scientific, and medical (ISM) bands. Bluetooth® offers a wide range of features to computing devices, such as pairing (e.g., connecting two devices for audio and/or video purposes) and direction finding (e.g., detecting locations). Examples disclosed herein utilize the direction finding feature of Bluetooth® to determine audience composition data in a panelist household. However, examples disclosed herein may additionally or alternatively utilize direction finding features offered in any other wireless protocol to determine audience composition.

Examples disclosed herein include device meters and/or personal meters to collect and/or obtain location data of panelists in a household using direction finding features of wireless protocol standards (e.g., Bluetooth®). In some examples, a device meter can communicate with a personal meter to determine a location of the personal meter. The device meter can store such location information in memory with a timestamp for subsequent processing by a separate entity, such as a back office or central facility. In other examples, a personal meter can communicate with a device meter to determine a location of the device meter. The personal meter can store such location information in memory with a timestamp for subsequent processing by a separate entity. In some examples disclosed herein, both the device meter and the personal meter periodically and/or aperiodically generate location measurements (e.g., every five seconds, 30 seconds, one minute, etc.). In this manner, examples disclosed herein can utilize a plurality of location measurements to determine audience composition data in a panelist household.

In examples disclosed herein, a central facility obtains location measurements from meters of panelist households to determine audience compositions of the panelist households. For example, the central facility utilizes the location measurements to generate and/or compose a media exposure map that can be used to determine where panelists, in a panelist household, are exposed to (e.g., view) media. Examples disclosed herein include methods and apparatus to generate such a media exposure map. In other examples disclosed herein, the location measurements can be used to determine where panelists, in the panelist household, are not exposed to media (e.g., do not view media). In such examples, the location measurements can be used as input to a learning model that trains a model to learns panelist behavior. For example, the learning model can determine whether an area in the media exposure environment corresponds to a sitting area, an area which household members pass through, etc.

FIG. 1 is an illustration of an example audience measurement system 100 having an example device meter 102 to monitor an example media presentation environment 104. In the illustrated example of FIG. 1, the media presentation environment 104 includes panelists 106, 107, and 108, an example media device 110 that receives media from an example media source 112, and the device meter 102. The device meter 102 identifies the media presented by the media device 110 and reports media monitoring information to an example central facility 114 of an audience measurement entity via an example gateway 116 and an example network 118. The example device meter 102 of FIG. 1 sends media identification data and/or audience identification data to the central facility 114 periodically, a-periodically and/or upon request by the central facility 114.

In FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 107 and 108 of the household have been statistically selected to develop media ratings data (e.g., television ratings data) for a population/demographic of interest. People become panelists via, for example, a user interface presented on a media device (e.g., via the media device 110, via a website, etc.). In some examples, an entire family may be enrolled as a household of panelists. That is, while a mother, a father, a son, and a daughter may each be identified as individual panelists, their viewing and/or exposure activities typically occur within the family's household.

In FIG. 1, one or more panelists 106, 107 and 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household, the example media presentation environment 104 can additionally or alternatively be any other type(s) of environments such as, for example, a theater, a restaurant, a tavern, a retail location, an arena, etc.

In FIG. 1, the example media device 110 is a television. However, the example media device 110 can correspond to any type of audio, video and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107 and 108).

The media source 112 may be any type of media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 of the illustrated example could be a personal computer such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example device meter 102 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the device meter 102, by physically mailing a memory of the device meter 102, etc.

The device meter 102 of FIG. 1 combines audience measurement data and people metering data. For example, audience measurement data is determined by monitoring media output by the media device 110 and/or other media presentation device(s), and audience identification data (also referred to as demographic data, people monitoring data, etc.) is determined from people monitoring data provided to the device meter 102. Thus, the example device meter 102 provides dual functionality of a content measurement meter to collect content measurement data and people meter to collect and/or associate demographic information corresponding to the collected audience measurement data.

For example, the device meter 102 of the illustrated example collects monitored information and/or data (e.g., signature(s), fingerprint(s), code(s), tuned channel identification information, time of exposure information, etc.) and people data (e.g., location measurements, user identifiers, demographic data associated with audience members, etc.). The monitored information and the people data can be combined to generate, for example, media exposure data (e.g., ratings data) indicative of amount(s) and/or type(s) of people that were exposed to specific piece(s) of media distributed via the media device 110. To extract monitored data, the device meter 102 and/or the example audience measurement system 100 extracts and/or processes the collected monitored information and/or data received by the device meter 102, which can be compared to reference data to perform source and/or content identification. Any other type(s) and/or number of media monitoring techniques can be supported by the device meter 102.

Depending on the type(s) of metering the device meter 102 is to perform, the device meter 102 can be physically coupled to the media device 110 or may be configured to capture signals emitted externally by the media device 110 (e.g., free field audio) such that direct physical coupling to the media device 110 is not required. For example, the device meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

In examples disclosed herein, the device meter 102 employs non-invasive monitoring using a low power wireless technology standard. In some examples, the standard is Bluetooth®. In some examples, the device meter 102 additionally or alternatively includes any other type of wireless technology standard, such as Zigbee, Z-Wave, 6LoWPAN, etc. In some examples, the device meter 102 utilizes the non-invasive monitoring to collect and/or generate a portion of the people data. For example, the device meter 102 monitors and obtains directional measurements of the panelists 106, 107, 108 and generates location data from the measurements. The example non-invasive monitoring of the device meter 102 is described in further detail below in connection with FIG. 2.

To generate exposure data for the media, identification(s) of media to which the audience is exposed are correlated with people data (e.g., presence information) collected by the device meter 102. The device meter 102 may collect inputs (e.g., audience identification data) representative of the identities of the audience member(s) (e.g., the panelists 106, 107 and 108). In some examples, the device meter 102 collects audience identification data by periodically or aperiodically prompting audience members in the monitored media presentation environment 104 to identify themselves as present in the audience. In some examples, the device meter 102 responds to predetermined events (e.g., when the media device 110 is turned on, a channel is changed, an infrared control signal is detected, etc.) by prompting the audience member(s) to self-identify. The audience identification data and the exposure data can then be complied with the demographic data collected from audience members such as, for example, the panelists 106, 107 and 108 during registration to develop metrics reflecting, for example, the demographic composition of the audience. The demographic data includes, for example, age, gender, income level, educational level, marital status, geographic location, race, etc., of the panelist.

In some examples, the device meter 102 may be configured to receive panelist information via an example input device 122 such as, for example, a remote control, An Apple iPad®, a cell phone, etc.). In such examples, the device meter 102 prompts the audience members to indicate their presence by pressing an appropriate input key on the input device 122. For example, the input device may enable the audience member(s) (e.g., the panelists 106, 107 and 108 of FIG. 1) and/or an unregistered user (e.g., a visitor to a panelist household) to input information to the device meter 102 of FIG. 1. This information includes registration data to configure the device meter 102 and/or demographic data to identify the audience member(s). For example, the input device 122 may include a gender input interface, an age input interface, and a panelist identification input interface, etc.

The device meter 102 of the illustrated example may also determine times at which to prompt the audience members to enter information to the device meter 102. In some examples, the device meter 102 of FIG. 1 supports audio watermarking for people monitoring, which enables the device meter 102 to detect the presence of a personal meter in the vicinity (e.g., in the media presentation environment 104) of the media device 110. In some examples, the acoustic sensor 120 of the device meter 102 is able to sense example audio output 124 (e.g., emitted) by an example personal meter 126, such as, for example, a wristband, a cell phone, etc., that is uniquely associated with a particular panelist. The audio output 124 by the example personal meter 126 may emit, for example, one or more audio watermarks to facilitate identification of the personal meter 126 and/or the panelist 106 associated with the personal meter 126.

In some examples, the device meter 102 of FIG. 1 supports low power wireless technology standards for people monitoring, which enables the device meter 102 to detect the presence of the personal meter 126 in the vicinity (e.g., in the media presentation environment 104) of the media device 110. For example, the personal meter 126 also supports low power wireless technology standard, which enables a low power and short range communication between the personal meter 126 and the device meter 102 via radio waves. In some examples, the personal meter 126 sends signals periodically and/or aperiodically, which may be obtained by the device meter 102. In other examples, the device meter 102 sends signals periodically and/or aperiodically, which may be obtained by the personal meter 126. Such signals can enable detection of the panelist 106 by the device meter 102, location of the panelist 106, etc. The example personal meter 126 is described in further detail below in connection with FIG. 3.

Although the example audience measurement system 100 illustrates a single panelist (e.g., panelist 106) having a personal meter 126, any of the panelists (e.g., panelists 107 and 108) in the audience measurement system 100 may include a people meter.

The example gateway 116 of FIG. 1 is a router that enables the device meter 102 and/or other devices in the media presentation environment (e.g., the media device 110) to communicate with the network 118 (e.g., the Internet).

In some examples, the example gateway 116 facilitates delivery of media from the media source 112 to the media device 110 via the Internet. In some examples, the example gateway 116 includes gateway functionality, such as modem capabilities. In some other examples, the example gateway 116 is implemented in two or more devices (e.g., a router, a modem, a switch, a firewall, etc.). The gateway 116 of the illustrated example may communicate with the network 118 via Ethernet, a digital subscriber line (DSL), a telephone line, a coaxial cable, a USB connection, a Bluetooth® connection, any wireless connection, etc.

In some examples, the example gateway 116 hosts a Local Area Network (LAN) for the media presentation environment 104. In the illustrated example, the LAN is a wireless local area network (WLAN), and allows the device meter 102, the media device 110, etc. to transmit and/or receive data via the Internet. Alternatively, the gateway 116 may be coupled to such a LAN. In some examples, the gateway 116 may be implemented with the example device meter 102 disclosed herein. In some examples, the gateway 116 may not be provided. In some such examples, the device meter 102 may communicate with the central facility 114 via cellular communication (e.g., the device meter 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The central facility 114 of the illustrated example is implemented by one or more servers. The central facility 114 processes and stores data received from the device meter 102 and/or from the personal meter 126. For example, the example central facility 114 of FIG. 1 combines audience identification data and monitored data from multiple households to generate aggregated media monitoring information. The central facility 114 generates reports for advertisers, program producers and/or other interested parties based on the compiled statistical data. Such reports include extrapolations about the size and demographic composition of audiences of content, channels and/or advertisements based on the demographics and behavior of the monitored panelists.

In some examples, the central facility 114 combines location measurements, times of obtaining the location measurements, and monitored data to generate media exposure maps corresponding to different media exposure areas (e.g., viewing areas) of the media presentation environment 104. For example, the central facility 114 collects and/or obtains location measurements from the device meter 102 and the personal meter 126 over a period of time and maps where the panelists 106, 107, and 108 were exposed to media from the media device 110. In some examples, the central facility 114 uses the location information measurements, the time measurements, and the monitored data to determine a behavior of the panelist 106, 107, and 108. For example, the central facility 114 trains a model to determine what the panelists 106, 107, and 108 do throughout a day in their household.

Angle of Arrival (AoA) and Angle of Departure (AoD) are direction finding features in wireless technology standards and protocols that enable a device to receive information about its own location and/or direction. A device, such as the device meter 102, the personal meter 126, and/or any computing device, can make its direction available to a peer device by transmitting direction finding enabled packets using a single antenna. A direction finding enabled packet is a packet of data that specifies a mode for direction finding and includes, in the payload, quadrature signals (IQ signals). In this example, the direction finding enabled packets have three possible modes. A first mode is "disabled" and specifies that the packet does not have fields required for direction finding. The first mode may be specified when no bits are set in a direction finding portion and/or field of the packet. A second mode is "Angle of Arrival" and specifies that the device packets use angle of arrival method of direction finding. The second mode may be specified when one bit is set in the direction finding portion and/or field of the packet. A third mode is "Angle of Departure" and specifies that the device packets use angle of departure method of direction finding. The third mode may be specified when two bits are set in the direction finding portion and/or field of the packet.

AoA is the relative direction at which a propagating radio frequency (RF) wave that was transmitted by a single antenna is incident on an antenna array. A location of a device can be determined utilizing AoA when the device transmits direction finding enabled packets using a single antenna. A peer device, consisting of an RF switch and antenna array, switches among different antennas of the antenna array while receiving part of the direction finding enabled packets from the device and captures IQ samples. The peer device utilizes the IQ samples to calculate a phase difference in the received radio signal (e.g., the IQ signals in the received direction finding packets) using different elements of the antenna array, which in turn can be used to estimate AoA. The peer device provides the estimated AoA to a positioning engine of the peer device, and the positioning engine calculates the location coordinates of the transmitting device.

AoD is the relative direction from which a propagating RF wave that was transmitted using an antenna array is incident on another antenna. The location of the device can be determined utilizing AoD when the device, consisting of an RF switch and antenna array, transmits direction finding enabled packets while switching among antennas of its antenna array during transmission. A peer device receives these direction finding enabled packets from the device using a single antenna and captures IQ samples during part of those packets. A determination of the direction of the device is based on the different propagation delays of the radio signals transmitted by the device between the transmitting elements of the antenna array and a receiving single antenna. The propagation delays are detectable with IQ measurements. Any peer device having a single antenna that supports AoD can capture IQ samples and, with the aid of profile-level information specifying the antenna layout of the transmitter device, calculate the angle of incidence of the incoming radio signal to estimate the AoD. Such profile-level information specifying the antenna layout may be included by the transmitter device in the direction finding enabled packets. The peer device provides the estimated AoD to a positioning engine of the peer device, and the positioning engine calculates the location coordinates of the transmitting device.

Figure 2:
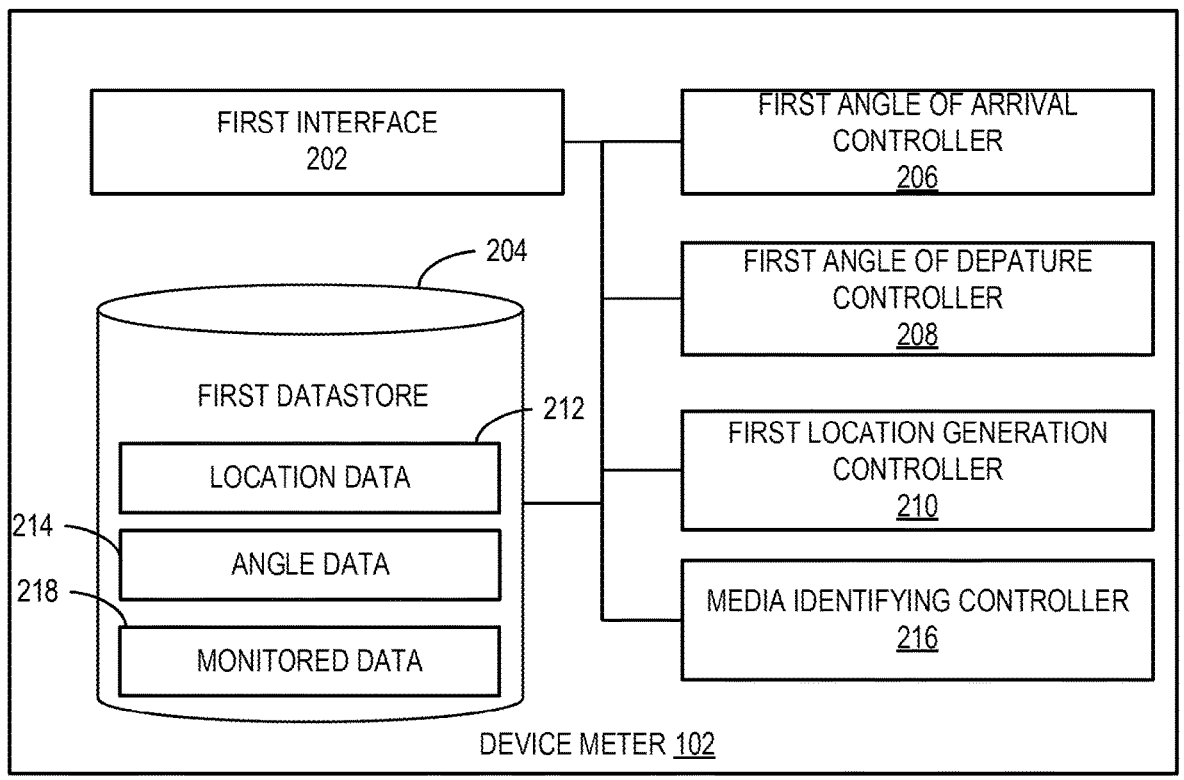
FIG. 2 is a block diagram of the example device meter of FIG. 1 to determine location information of panelists of the media presentation environment.

FIG. 2 is a block diagram of the example device meter 102 of FIG. 1. The example device meter 102 includes an example first interface 202, an example first datastore 204, an example first angle of arrival controller 206, an example first angle of departure controller 208, an example first location generation controller 210, and an example first media identifying controller 216. The example device meter 102 includes other components and elements that are not illustrated in FIG. 2 to monitor media in the media presentation environment 104. The example device meter 102 implements a wireless protocol standard that supports angle of arrival and/or angle of departure measurements. In some examples, the device meter 102 implements a Bluetooth® 5.1 standard released on Jan. 21, 2019, which supports angle of arrival and angle of departure measurements. In some examples, the device meter 102 additionally or alternatively implements IEEE 802.11a/b/g/n/ac standard(s) and/or other wireless protocol standards that support angle of arrival and/or angle of departure measurements.

In FIG. 2, the example first interface 202 is to communicate with other devices (e.g., the personal meter 126, the media device 110, the media source 112, etc.) to receive information and/or transmit information. In some examples, the first interface 202 is an interface for receiving radio signals (e.g., UHF signals), such as a configuration including an antenna array, a radio frequency switch, and a receiver. In other examples, the first interface 202 is implemented by a host controller interface (HCI), a network interface controller (NIC), etc. In the illustrated example, the first interface 202 is to communicate with the example personal meter 126. In some examples, the first interface 202 is to communicate with any type of computing device (e.g., laptop, tablet, smartphone, wireless headphones, etc.) that is capable of wireless communication. In some examples, the first interface 202 enables antenna switching. As used herein, antenna switching is the process of switching between one or more antennas of an antenna array based on the frequency of an incoming and/or outgoing signal.

In some examples, the first interface 202 obtains direction finding enabled packets, referred to herein as packets. The packets are formatted units of data including direction finding information, such as bits identifying whether the packet will enable direction finding, what type of mode, if enabled, is set for the direction finding, the source of the packet, etc. For example, a device (e.g., the personal meter 126) transmitting the packets may notify a receiving device (e.g., the device meter 102 and/or first interface 202), via the packet, whether the receiving device is to identify a direction of the transmitting device. Direction finding enables a receiving device to determine the direction of the transmitting device, and the receiving device utilizes the direction estimation to ultimately identify the location and/or position of the transmitting device. In some examples, the device meter 102 supports one or both of the following two modes of direction finding: Angle of Arrival (AoA) and Angle of Departure (AoD).

In some examples, the first interface 202 obtains packets and determines whether they are direction finding enabled packets. For example, the first interface 202 analyzes the packet for a set mode corresponding to direction finding. In some examples, when the first interface 202 determines the direction finding mode is enabled, the first interface 202 determines what type of direction finding mode is enabled. In some examples, the packet includes a bit corresponding to the type of direction finding, AoA, AoD, or disabled. In some examples, the first interface 202 analyzes bits in the packet indicative of the type of direction finding and determines the type is AoA. In such an example, the first interface 202 invokes the example first angle of arrival controller 206. In some examples, the first interface 202 analyzes bits in the packet indicative of the type of direction finding and determines the type is AoD. In such an example, the first interface 202 invokes the example first angle of departure controller 208. In some examples, the first interface 202 stores packets in the example first datastore 204. For example, the first interface 202 stores the packets in the first datastore 204 for subsequent processing by the first angle of arrival controller 206 and/or the first angle of departure controller 208.

In FIG. 2, the example first datastore 204 stores and/or records data from the example first interface 202, the example first angle of arrival controller 206, the example first angle of departure controller 208, the example first location generation controller 210, and/or the example media identifying controller 216. Additionally and/or alternatively, the example first datastore 204 stores and/or records data from the example personal meter 126, The example first datastore 204 includes location data 212, angle data 214, and monitored data 218. The first datastore 204 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The first datastore 204 may additionally or alternatively be implemented by one or more double data rate (DDR) memories, such as DDR, DDR2, DDR3, DDR4, mobile DDR (mDDR), etc. The first datastore 204 may additionally or alternatively be implemented by one or more mass storage devices such as hard disk drive(s), compact disk (CD) drive(s), digital versatile disk (DVD) drive(s), solid-state disk drive(s), etc. While in the illustrated example the first datastore 204 is illustrated as a single datastore, the first datastore 204 may be implemented by any number and/or type(s) of datastores. Furthermore, the data stored in the first datastore 204 may be in any data format such as, for example, binary data, comma delimited data, tab delimited data, structured query language (SQL) structures, etc.

In some examples, the first interface 202 sends the location data 212, the angle data 214, and monitored data 218 from the first datastore 204 to the central facility 114 of FIG. 1 via the gateway 116 and the network 118. For example, the device meter 102 is to communicate with the central facility 114 via the gateway 116 and network 118 and, thus, the first interface 202 communicates location data 212, angle data 214, and monitored data 218 to the central facility 114 when the first datastore 204 stores a threshold amount of location data 212, angle data 214, and monitored data 218. In some examples, the threshold amount of location data 212, angle data 214, and/or monitored data 218 is/are determined by the size of the first datastore 204, an administrator of the central facility 114, etc.

In FIG. 2, the example first angle of arrival controller 206 is to generate angle data 214 for estimating the location of the example personal meter 126. The example first angle of arrival controller 206 is to determine angles of packets "arriving" from the personal meter 126 to generate the angle data 214. The example first angle of arrival controller 206 to communicate with the example first interface 202 to receive information (e.g., packet information) that can be utilized to determine the angle of arrival. In some examples, the first angle of arrival controller 206 is invoked by the first interface 202 when the first interface 202 determines angle of arrival is to be estimated from the packets. The example first angle of arrival controller 206 extracts IQ samples from packets to estimate the angles. For example, the first angle of arrival controller 206 can use the IQ samples to calculate a phase difference in the signal carrying the packets (e.g., the radio signal) by utilizing different elements of an antenna array (e.g., when the first interface 202 implements an antenna array). In some examples, the first angle of arrival controller 206 utilizes the phase difference to determine the angle of arrival. In some examples, the first angle of arrival controller 206 provides the angle data 214 to the first location generation controller 210 for subsequent processing to determine location data 212. Estimating the angle of arrival is described in further detail in the "Bluetooth Core Specification, v5.1" which is incorporated by reference in its entirety. Although the example first angle of arrival controller 206 described herein implements Bluetooth® 5.1 standard, the example first angle of arrival controller 206 may implement any other wireless protocol that supports angle of arrival measurements.

In FIG. 2, the example first angle of departure controller 208 generates angle data 214. The example first angle of departure controller 208 is invoked by the first interface 202 responsive to receiving packets from a transmitting device having a switched antenna array, such as the example personal meter 126. The first angle of departure controller 208 is to determine angles of packets "departing" from the personal meter 126 to generate angle data. In some examples, the first interface 202 includes a single antenna and, thus, the device meter 102 estimates an angle of departure of packets from the switched antenna array of the personal meter 126. The example first angle of departure controller 208 communicates with the example first interface 202 to receive information (e.g., packet information) that can be utilized to determine the angle of departure. The example first angle of departure controller 208 extracts IQ samples from packets to estimate the angles. For example, the first angle of departure controller 208 can use the IQ samples to detect propagation delays in the signal carrying the packets (e.g., the radio signal) between transmitting elements of the multiple antennas of the personal meter 126 and the single antenna of the device meter 102 (e.g., when the first interface 202 implements one antenna). In some examples, the first angle of departure controller 208 provides the angle data 214 to the first location generation controller for subsequent processing, such as for determining location data 212. Estimating the angle of departure is described in further detail in the "Bluetooth Core Specification, v5.1." Although the example first angle of departure controller 208 described herein implements Bluetooth® 5.1 standard, the example first angle of departure controller 208 may implement any other wireless protocol that supports angle of departure measurements.

In FIG. 2, the example first location generation controller 210 is to generate location data 212 based on angle data 214 (e.g., angle measurements) from the first AoA controller 206 and/or the first AoD controller 208. The example first location generation controller 210 determines the location and/or relative position of the example personal meter 126 based on the angle data 214. The example first location generation controller 210 may be notified by the example first AoA controller 206 and/or the first AoD controller 208 that angle data 214 has been determined and stored in the first datastore 204. The example first location generation controller 210 may determine the position of the personal meter 126 relative to the device meter 102 and, thus, determine the location of the personal meter 126. The example first location generation controller 210 may utilize triangulation to measure the locations and/or positions of the personal meter 126. In some examples, the first location generation controller 210 utilizes a positioning algorithm to generate location data 212 based on the signal strength of the radio signal carrying the packets. The example first location generation controller 210 generates location data 212 to include coordinates of the personal meter 126 and a timestamp of the coordinates. The example first location generation controller 210 generates location data 212 to include coordinates of the personal meter 126 and a timestamp of the coordinates. For example, the first location generation controller 210 stores the location data 212 with corresponding times at which packets, corresponding to the location data 212, were sent and/or received. For example, the panelist 106 may be in a first position with the personal meter 126 at a first time and may be in a second position with the personal meter 126 at a second time. In such an example, location data corresponding to the first position is stored with the first time and location data corresponding to the second position is stored with the second time. The location data 212 may be utilized by the central facility 114 to develop an outline of a media exposure map for the media presentation environment 104. For example, the central facility 114 monitors the angles of the personal meter 126 to other meters in the household (e.g., the device meter 102, other device meters using the techniques described above, etc.) based on the measurements generated and/or provided by the AoA and/or AoD features of the personal meter 126.

In FIG. 2, the example media identifying controller 216 is to generate monitored data 218. The example media identifying controller 216 monitors for audio and/or video codes (e.g., watermarks) presented via the example media device 110 of FIG. 1. In some examples, the media identifying controller 216 utilizes audio watermarking techniques to identify the media. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or one or more identifier(s) that may be mapped to media identifying information, into an audio and/or video component of the media. In some examples, the audio and/or video component of the media is selected to have a signal characteristic sufficient to hide the watermark. As used herein, the terms "code" and/or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. In some examples, to identify watermarked media, the watermark(s) are extracted and used to access a table of reference watermarks that are mapped to media identifying information.

In some examples, the media identifying controller 216 generates signatures based on audio and/or video presented via the media device 110 to determine monitored data 218. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, the media identifying controller 216 outputs identifiers of the media to the first datastore 204, and the first datastore 204 stores the identifiers as monitored data 218. In such an example, the media identifying controller 216 additionally stores the identifiers with timestamps. In other examples, the identifiers include timestamps. The example first datastore 204 may associate the identifiers of the monitored data 218 with angles of the angle data 214 and/or locations of the location data 212. For example, the first datastore 204 may map the monitored data 218, the location data 212, and the angle data 214 to an appropriate timestamp, thus associating the data with each other and to a particular time. In some examples, the monitored data 218 is utilized by the central facility 114 when determining which angles and locations to use when generating media exposure maps.

While an example manner of implementing the device meter 102 of FIG. 1 is illustrated in FIG. 2, one or more of the elements, processes and/or devices illustrated in FIG. 2 may be combined, divided, re-arranged, omitted, eliminated and/or implemented in any other way. Further, the example first interface 202, the example first datastore 204, the example first angle of arrival controller 206, the example first angle of departure controller 208, the example location generation controller 210, the example media identifying controller 216 and/or, more generally, the example device meter 102 of FIG. 1 may be implemented by hardware, software, firmware and/or any combination of hardware, software and/or firmware. Thus, for example, any of the example first interface 202, the example first datastore 204, the example first angle of arrival controller 206, the example first angle of departure controller 208, the example location generation controller 210, the example media identifying controller 216, and/or, more generally, the example device meter 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first interface 202, the example first datastore 204, the example first angle of arrival controller 206, the example first angle of departure controller 208, the example location generation controller 210, and/or the example media identifying controller 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example device meter 102 of FIG. 1 may include one or more elements, processes and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
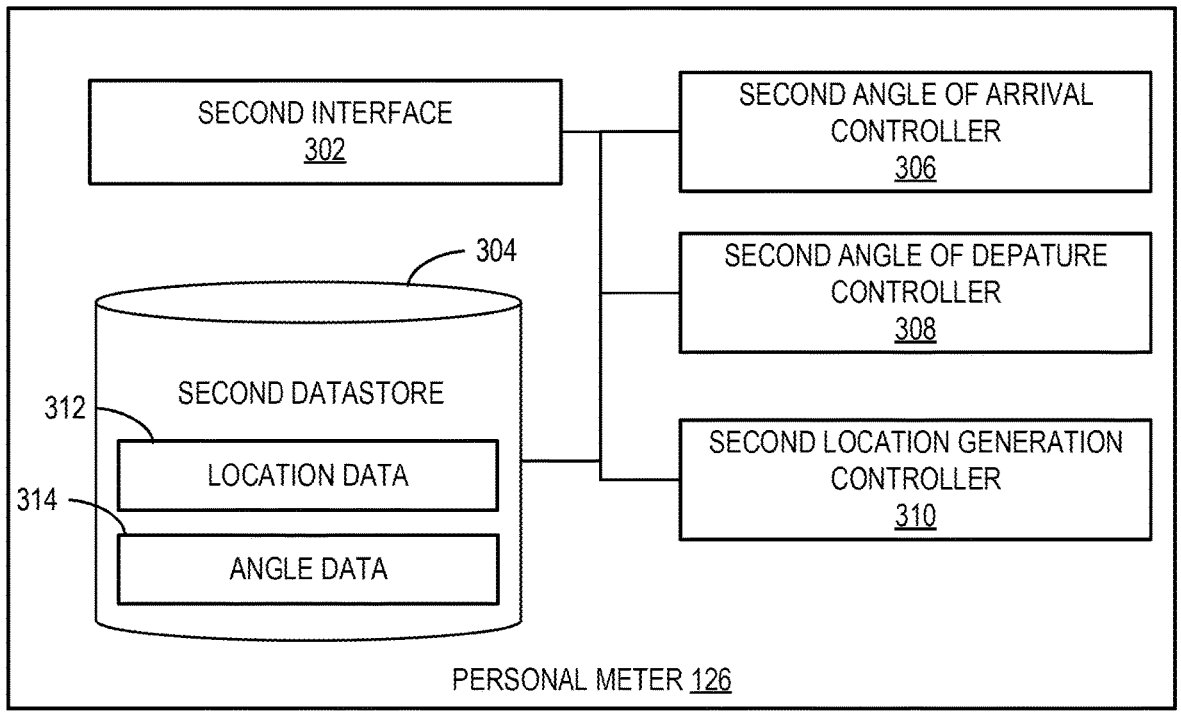
FIG. 3 is a block diagram of an example personal meter of FIG. 1 to determine location information of panelists of the media presentation environment.

FIG. 3 is a block diagram of the example personal meter 126 of FIG. 1. In some examples, the personal meter 126 is to determine location data 312 of the device meter 102 based on angle data 314. The example personal meter 126 includes an example second interface 302, an example second datastore 304, an example second angle of arrival controller 306, an example second angle of departure controller 308, and an example second location generation controller 310. The example personal meter 126 includes other components and elements that are not illustrated in FIG. 3 to record a presence of a panelist in the media presentation environment 104. The example personal meter 126 can be implemented by a special purpose metering device, or by software downloaded to and executed by a smart mobile device. The example personal meter 126 implements a wireless protocol standard that supports angle of arrival and angle of departure measurements. For example, the personal meter 126 implements the Bluetooth® 5.1 standard released on Jan. 21, 2019, to support angle of arrival and angle of departure measurements. In other examples, the personal meter 126 additionally and/or alternatively implements IEEE 802.11a/b/g/n/ac standard(s) and/or other wireless protocol standards that support angle of arrival and/or angle of departure measurements. Additionally, although reference is made to only one personal meter 126 of one panelist 106, any panelist (e.g., panelist 107, 108, etc.) may include a people meter that supports AoA and AoD estimation.

In FIG. 3, the example second interface 302 is to communicate with other devices (e.g., the device meter 102, the media device 110, the media source 112, etc.) to receive information and/or transmit information. In some examples, the second interface 302 implements a single antenna to transmit and receive radio signals (e.g., UHF signals) to and from the device meter 102. Additionally and/or alternatively, the second interface 302 implements an antenna array including more than one antenna to receive and transmit radio signals (e.g., UHF signals) to and from the device meter 102. In such examples, the second interface 302 enables antenna switching.

In some examples, the second interface 302 transmits direction finding enabled packets. For example, the second interface 302 is to send packets of information indicating to the device meter 102 to find and/or estimate an angle of the personal meter 126. In some examples, the second interface 302 is to include information in the packets that correspond to how the device meter 102 is to estimate angles of the personal meter 126. For example, the second interface 302 sets a direction finding mode in the packets, where the mode includes AoA, AoD, or no direction finding enabled.

In some examples, the second interface 302 obtains direction finding enabled packets. For example, the second interface 302 may receive packets from the device meter 102 indicative to determine and/or calculate angle data 314 of the device meter 102. The example second interface 302 initiates the example second angle of arrival controller 306 or the example second angle of departure controller 308 based on the packets obtained from the device meter 102.

The example second interface 302 initiates and/or invokes the second angle of arrival controller 306 when packets are transmitted from a single antenna and are indicative to estimate an angle of arrival. The example second interface 302 initiates and/or invokes the second angle of departure controller 308 when packets are transmitted from an antenna array (e.g., more than one antenna) and are indicative to estimate an angle of departure.

In FIG. 3, the example second datastore 304 stores and/or records data from the example second interface 302, the example second angle of arrival controller 306, the example second angle of departure controller 308, and/or the example second location generation controller 310. The example second datastore 304 includes location data 312 and angle data 314. The second datastore 304 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The second datastore 304 may additionally or alternatively be implemented by one or more double data rate (DDR) memories, such as DDR, DDR2, DDR3, DDR4, mobile DDR (mDDR), etc. The second datastore 304 may additionally or alternatively be implemented by one or more mass storage devices such as hard disk drive(s), compact disk (CD) drive(s), digital versatile disk (DVD) drive(s), solid-state disk drive(s), etc. While in the illustrated example the second datastore 304 is illustrated as a single datastore, the second datastore 304 may be implemented by any number and/or type(s) of datastores. Furthermore, the data stored in the second datastore 304 may be in any data format such as, for example, binary data, comma delimited data, tab delimited data, structured query language (SQL) structures, etc.

In some examples, the second interface 302 sends the location data 312 and the angle data 314 from the second datastore 304 to the central facility 114 of FIG. 1 via the gateway 116 and the network 118. For example, the personal meter 126 is to communicate with the central facility 114 via the gateway 116 and network 118 and, thus, the second interface 302 communicates location data 312 and angle data 314 to the central facility 114 when the second datastore 304 stores a threshold amount of location data 312 and angle data 314. In some examples, the threshold amount of location data 312 and angle data 314 is determined by the size of the second datastore 304, an administrator of the central facility 114, etc.

In FIG. 3, the example second angle of arrival controller 306 generates angle data 314 included in the example second datastore 304 of FIG. 3. The example second angle of arrival controller 306 is to determine angles of packets "arriving" from the device meter 102 to generate angle data 314. The example second angle of arrival controller 306 is to communicate with the example second interface 302 to receive information (e.g., packet information) that can be utilized to determine the angle of arrival. In some examples, the second angle of arrival controller 306 is invoked by the second interface 302 when the second interface 302 determines angle of arrival is to be estimated from the packets. The example second angle of arrival controller 306 extracts IQ samples from packets to estimate the angles. For example, the second angle of arrival controller 306 can use the IQ samples to calculate a phase difference in the signal carrying the packets (e.g., the radio signal) by utilizing different elements of an antenna array (e.g., when the second interface 302 implements an antenna array). In some examples, the second angle of arrival controller 306 utilizes the phase difference to determine the angle of arrival. In some examples, the second angle of arrival controller 306 provides the angle data 314 to the device meter 102 for subsequent processing by the first location generation controller 210 of FIG. 2. Although the example second angle of arrival controller 306 described herein implements Bluetooth® 5.1 standard, the example second angle of arrival controller 306 may be implemented by any other wireless protocol that supports angle of arrival measurements.

In FIG. 3, the example second angle of departure controller 308 generates the example angle data 314 included in the example second datastore 304 of FIG. 3. The example second angle of departure controller 308 is to determine angles of packets "departing" from the device meter 102 to generate the example angle data 314. In some examples, the second interface 302 includes a single antenna and, thus, the personal meter 126 estimates an angle of departure of packets from multiple antennas of the device meter 102. The example second angle of departure controller 308 is to communicate with the example second interface 302 to receive information (e.g., packet information) that can be utilized to determine the angle of departure. In some examples, the second angle of departure controller 308 is invoked by the second interface 302 when the second interface 302 determines angle of departure is to be estimated from the packets. The example second angle of departure controller 308 extracts IQ samples from packets to estimate the angles. For example, the second angle of departure controller 308 utilizes the IQ samples to detect propagation delays in the signal carrying the packets (e.g., the radio signal) between transmitting elements of the multiple antennas of the device meter 102 and the single antenna of the personal meter 126 (e.g., when the second interface 302 implements one antenna). Although the example second angle of departure controller 308 described herein implements Bluetooth® 5.1 standard, the example second angle of departure controller 308 may be implemented by any other wireless protocol that supports angle of departure measurements.

In FIG. 3, the example second location generation controller 310 is to generate location data 312 based on the angle data 314 (e.g., angle measurements). For example, the second location generation controller 310 is to utilize angle data 314 generated by the second angle of arrival controller 306 and/or the second angle of departure controller 308 of FIG. 3. The example second location generation controller 310 determines a location of the device meter 102 based on the angle data 314. For example, the second location generation controller 310 may determine the position of the device meter 102 relative to the personal meter 126 and, thus, determine the location of the device meter 102. The example second location generation controller 310 may utilize triangulation to measure the locations and/or positions of the device meter 102. In other examples, the second location generation controller 310 utilizes a positioning algorithm to generate location data 312 based on the signal strength of the radio signal carrying the packets. The example second location generation controller 310 generates location data 312 to include coordinates of the device meter 102 and a timestamp of the coordinates. For example, the second location generation controller 310 stores the location data 312 with corresponding times at which packets, corresponding to the location data 312, were sent and/or received. The location data 312 may be utilized by the central facility 114 to develop an outline of a media exposure map for the media presentation environment 104.

In some examples, the location data 212 of the device meter 102 does not change. For example, the device meter 102 changes location when the media device 110 is relocated. Media device 110 relocation may occur less often when the media device is a television, a desktop computer, etc. Therefore, the example first interface 202 and/or more generally, the example device meter 102, may seldomly send direction finding enabled packets to the personal meter 126, because the location of the device meter 102 seldomly changes.

In some examples, the personal meter 126 is not configured with the second angle of arrival controller 306, the second angle of departure controller 308, and/or the second location generation controller 310. For example, the personal meter 126 may only second direction finding enabled packets to nearby meters (e.g., the device meter 102), location estimating devices, etc., to enable the meters, location estimating devices, etc., to identify the location of the personal meter 126. The example personal meter 126 may not perform location estimating due to limited processing power, processing resources, etc.

While an example manner of implementing the personal meter 126 of FIG. 1 is illustrated in FIG. 3, one or more of the elements, processes and/or devices illustrated in FIG. 3 may be combined, divided, re-arranged, omitted, eliminated and/or implemented in any other way. Further, the example second interface 302, the example second datastore 304, the example second angle of arrival controller 306, the example second angle of departure 308, the example second location generation controller 310, and/or, more generally, the example personal meter 126 of FIG. 1 may be implemented by hardware, software, firmware and/or any combination of hardware, software and/or firmware. Thus, for example, any of t the example second interface 302, the example second datastore 304, the example second angle of arrival controller 306, the example second angle of departure 308, the example second location generation controller 310, and/or, more generally, the example personal meter 126 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example second interface 302, the example second datastore 304, the example second angle of arrival controller 306, the example second angle of departure 308, and/or the example second location generation controller 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example personal meter 126 of FIG. 1 may include one or more elements, processes and/or devices in addition to, or instead of, those illustrated in FIG. 3, and/or may include more than one of any or all of the illustrated elements, processes, and devices.

Figure 4A:
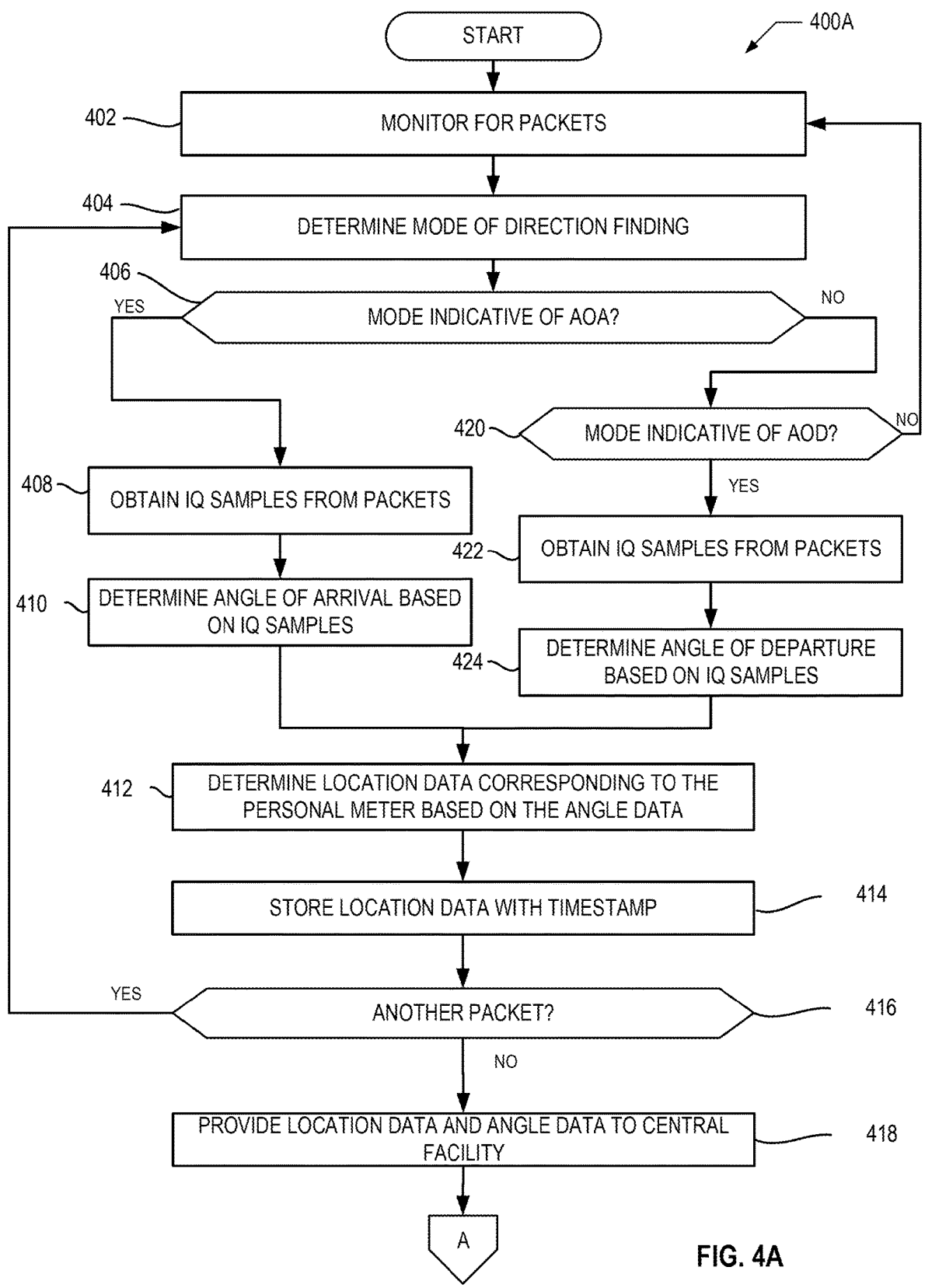
FIGS. 4A and 4B are flowcharts representative of machine readable instructions which may be executed to implement the meter of FIGS. 1 and 2 to estimate angle data.
Figure 4B:
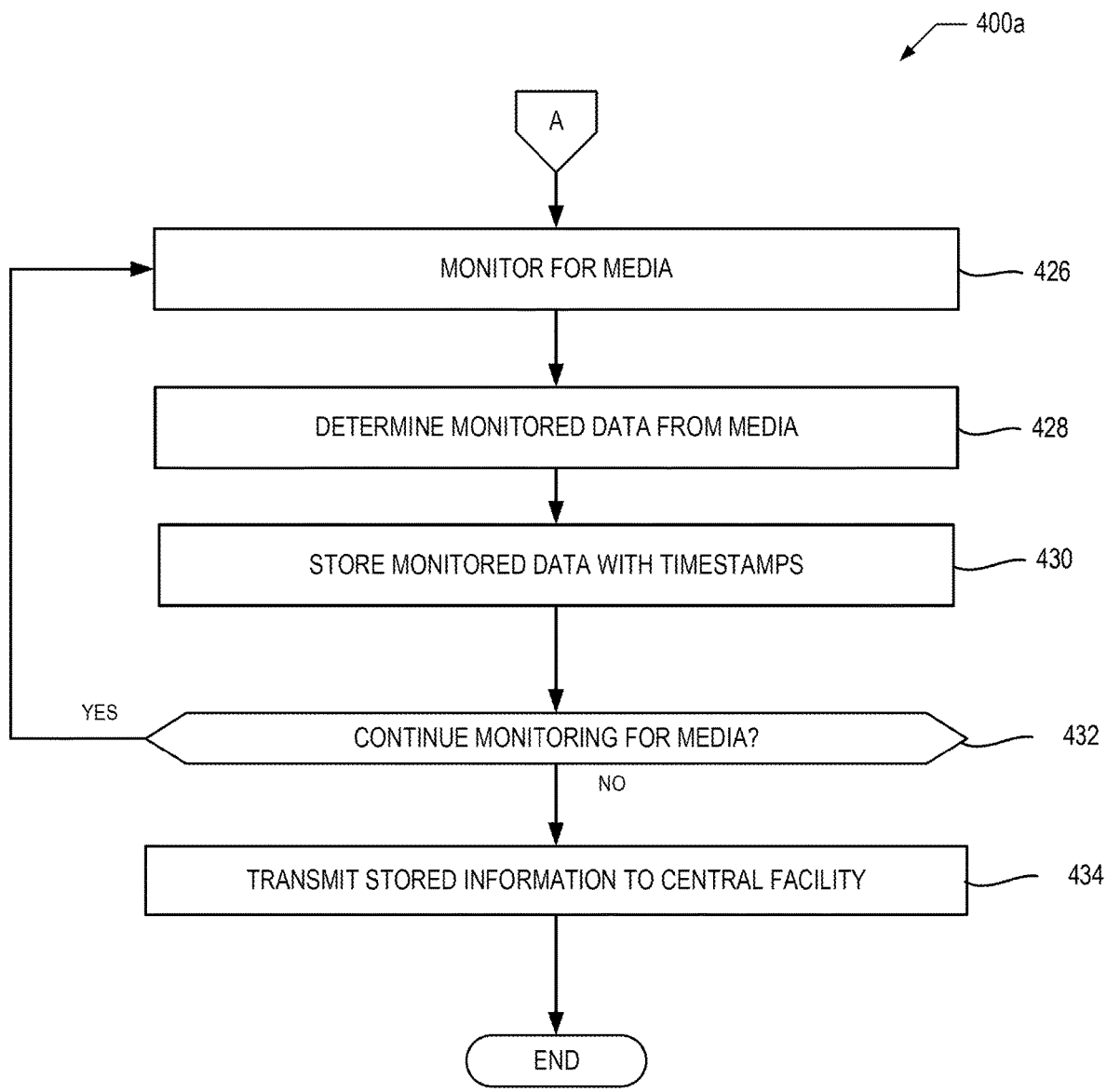
Figure 4C:
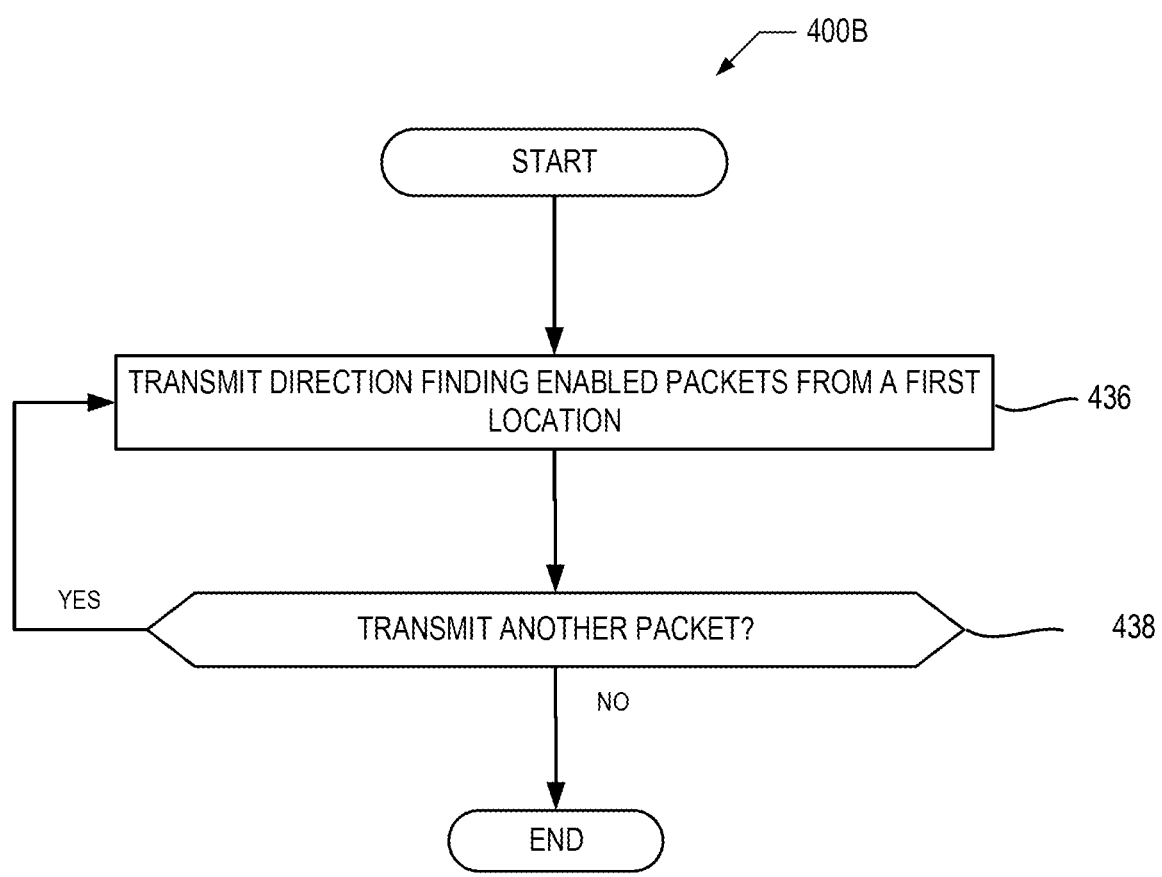
FIG. 4C is a flowchart representative of machine readable instructions which may be executed to implement the personal meter of FIGS. 1 and 3 to estimate location information.

FIGS. 4A and 4B illustrate an example angle and location estimating program 400A to implement the device meter 102 of FIGS. 1 and 2. FIG. 4C illustrates an example packet transmitting program 400B to implement the personal meter 126 of FIGS. 1 and 3. The angle and location estimating program 400A and the example packet transmitting program 400B are described in further detail below in connection with flowchart descriptions of FIGS. 4A, 4B, and 4C.

Figure 5:
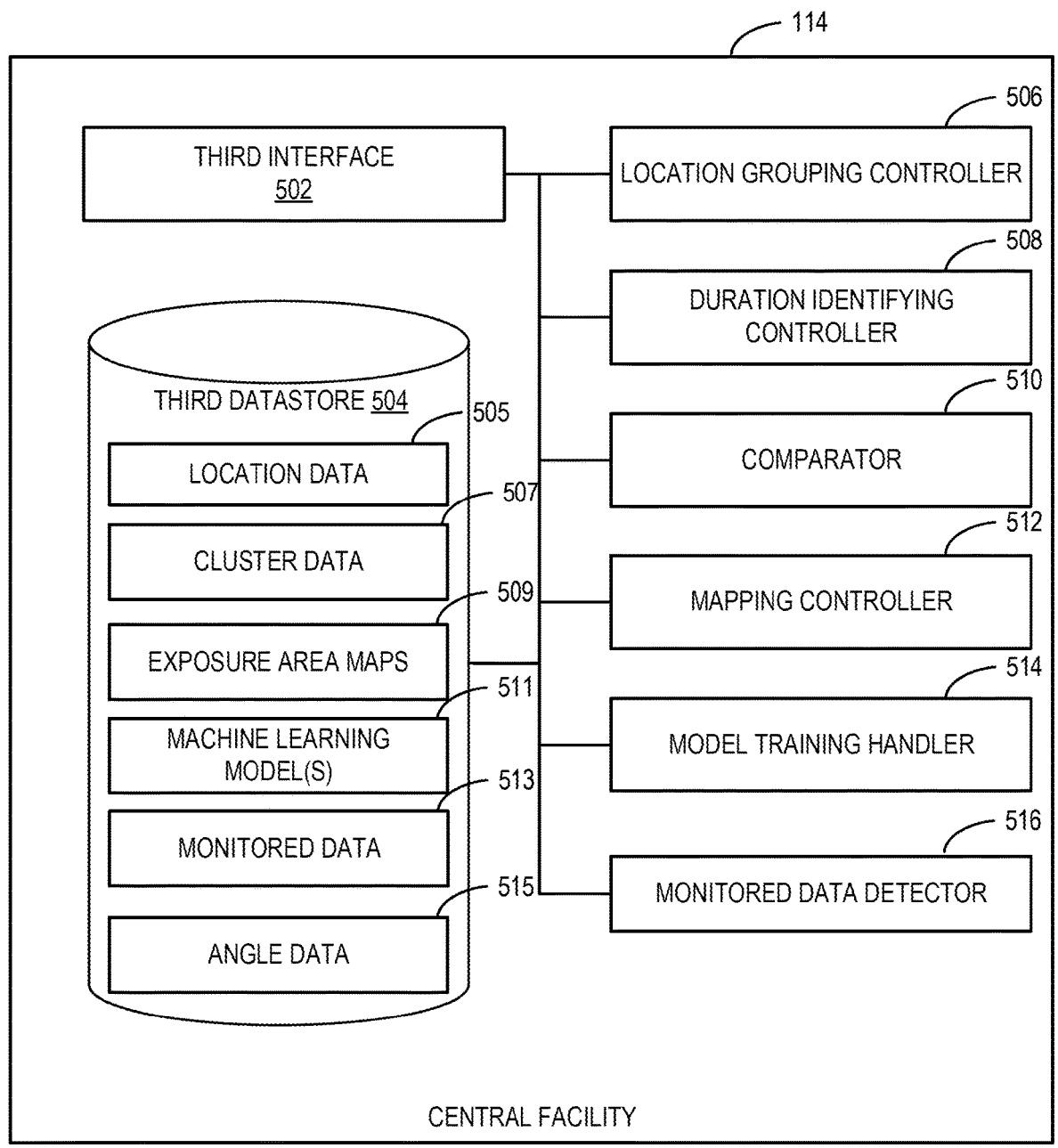
FIG. 5 is a block diagram of an example central facility of FIG. 1 to determine a media exposure map of the media presentation environment.

FIG. 5 is a block diagram of an example central facility 114 of FIG. 1 to determine a media exposure map of the media presentation environment 104. The example central facility 114 includes an example third interface 502, an example third datastore 504, an example location grouping controller 506, an example duration identifying controller 508, an example comparator 510, an example mapping controller 512, an example model training handler 514, and an example monitored data detector 516.

In FIG. 5, the example third interface 502 is a network interface card (NIC). In some examples, the third interface 502 is an interface circuit that is implemented by any type of interface standard, such as an Ethernet interface, a universal serial bus (USB), a Bluetooth® interface, a near field communication (NFC) interface, and/or a PCI express interface. The example third interface 502 obtains location data 505 (e.g., a combination of location data 212 and location data 312) and angle data 515 (e.g., a combination of angle data 214 and angle data 314) from the example device meter 102 and/or the example personal meter 126. The example third interface 502 and/or more generally, the example central facility 114 may obtain data from a number of meters at one site (e.g., from one location, one household, one media environment, etc.) and/or from a number of sites (e.g., from multiple locations, multiple households, multiple media environments, etc.). In some examples, the third interface 502 requests data from the meters. For example, the third interface 502 may notify the device meter 102 and/or the personal meter 126 to send location data 505 and angle data 515 based on a request from an administrator of the central facility 114. The example third interface 502 is to communicate with the device meter 102, the personal meter 126, and the media device 110 via the network 118.

The example third interface 502 implements means for obtaining, means for communicating, and/or obtaining means.

In FIG. 5, the example third datastore 504 stores and/or records data from the example personal meter 126, the example device meter 102, the example location grouping controller 506, the example duration identifying controller 508, the example comparator 510, the example mapping controller 512, the example model training handler 514, and the example monitored data detector 516. The example third datastore 504 includes location data 505, cluster data 507, media exposure maps 509, machine learning model(s) 511, monitored data 513, and angle data 515. The third datastore 504 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The third datastore 504 may additionally or alternatively be implemented by one or more double data rate (DDR) memories, such as DDR, DDR2, DDR3, DDR4, mobile DDR (mDDR), etc. The third datastore 504 may additionally or alternatively be implemented by one or more mass storage devices such as hard disk drive(s), compact disk (CD) drive(s), digital versatile disk (DVD) drive(s), solid-state disk drive(s), etc. While in the illustrated example the third datastore 504 is illustrated as a single datastore, the third datastore 504 may be implemented by any number and/or type(s) of datastores. Furthermore, the data stored in the third datastore 504 may be in any data format such as, for example, binary data, comma delimited data, tab delimited data, structured query language (SQL) structures, etc.

In FIG. 5, the example location grouping controller 506 is to generate cluster data 507. The example location grouping controller 506 generates cluster data 507 by determining groups within the location data 505 that have similar proximities and/or locations. For example, the location data 505 may include any number of locations corresponding to where the personal meter 126 was located during a particular time. For example, the panelist 106, having the personal meter 126, may move around in the media presentation environment 104 throughout a period of time. In some examples, the device meter 102 and/or the personal meter 126 collect location points of the personal meter 126 in time intervals (e.g., every 1 second, 5 seconds, 30 seconds, 1 minute, etc.) based on the angle of arrival and angle of departure measurements. In some examples, some of the location points may be the same (e.g., the panelist 106 did not move in a 5 second time period), may be approximately the same (e.g., the panelist 106 moved slightly such as shifted in their seat or on their feet, etc.), or may be completely different (e.g., the panelist 106 went to a completely different area of the media presentation environment 104). In such an example, the location grouping controller 506 groups the location points that are the same and/or approximately the same into a cluster. In some examples, the location grouping controller 506 implements clustering algorithms, such as K-means clustering, mean-shift clustering, density-based spatial clustering, Agglomerative Hierarchical clustering, etc., to group together the location points in the location data 505 to generate cluster data 507. For example, the location grouping controller 506 selects a number of initial locations in the location data 505 and identifies distinct groups and their respective center points. The example location grouping controller 506 then utilizes the initial locations and their respective center points to continue re-grouping the location data 505 and changing their respective center points for a set number of iterations or until the centers of the groups don't change between iterations. In some examples, the location grouping controller 506 groups the similar locations together as a location cluster. For example, the location grouping controller 506 may generate 5, 10, 15, 20, 50, or more clusters from the location data 505. The example location grouping controller 506 stores the cluster data 507 in the example third datastore 504.

In some examples, the location grouping controller 506 groups angles of the angle data 515 together. For example, the location grouping controller 506 may group together similar and/or approximately similar angles. In some examples, the location grouping controller 506 generates clusters of angles utilizing clustering algorithms. In some examples, the clusters of angles include clusters of timestamps. In some examples, the location grouping controller 506 utilizes the groups of angles to generate location data 505. In other examples, the location grouping controller 506 stores the clusters and/or groups of angles in the third datastore 504 for subsequent use by the mapping controller 512.

The example location grouping controller 506 implements means for grouping locations, means for generating cluster data, means for clustering, means for determining groups of locations, means for generating groups of angles, means for generating clusters of angles, and location grouping means. For example, the means for generating groups may be implemented by executable instructions such as that implemented by at least blocks 704, 718, and/or 720, of FIG. 7 and at least blocks 802 and/or 804 of FIG. 8. In some examples, the executable instructions of blocks 704, 718, and/or 720 of FIG. 7 and block 802 and/or 804 of FIG. 8 may be executed on at least one processor such as the example processor 1112 of FIG. 11. In other examples, the means for generating groups is implemented by hardware logic, hardware implemented state machines, logic circuitry, and/or any other combination of hardware, software, and/or firmware. For example, the means for generating groups may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In FIG. 5, the example duration identifying controller 508 is to analyze timestamps corresponding to the location clusters in the cluster data 507 to determine a duration of the location. As used herein, a duration of the location is a period of time corresponding to how long the personal meter 126 was in a particular location. For example, the duration identifying controller 508 assists in determining whether a particular location (e.g., a location cluster) corresponds to an area of media exposure or an area of transit (e.g., a hallway) based on how long a panelist (e.g., the panelist 106) is in that particular location. In some examples, an area of media exposure (e.g., viewing) may include an area having a couch, a seat, a table, a desk, a bar, etc. In some examples, an area of transit may be an area where panelists walk through to get to another room in the household, such as a hallway, a doorway, etc.

In some examples, the duration identifying controller 508 determines durations of a location cluster based on the timestamps of the locations in the location cluster. For example, a first set of locations corresponding to a first location cluster may have timestamps ranging from 6:00 PM to 6:15 PM, a second set of locations corresponding to a second location cluster may have timestamps ranging from 6:16:10 PM to 6:16:50 PM, etc. In such examples, the duration identifying controller 508 determines that the first cluster has a duration of 15 minutes and the second cluster has a duration of 40 seconds. In some examples, the duration identifying controller 508 determines the range of timestamps by aligning the cluster data 507 in a timeline based on respective timestamps, by summing the timestamps, and/or by any other means of associating the timestamps in a location cluster to a range of time.

In some examples, the duration identifying controller 508 iteratively determines durations of location clusters. For example, the duration identifying controller 508 selects a first cluster in the cluster data 507 for which a duration is to be determined, then selects a second cluster in the cluster data 507 for which a duration is to be determined, and so on. In some examples, after one iteration, the duration identifying controller 508 invokes the comparator 510 to compare the determined duration to a threshold duration.

The example duration identifying controller 508 implements means for determining durations, means for identifying durations, and duration identifying means. For example, the means for determining durations may be implemented by executable instructions such as that implemented by at least blocks 706, 708, and/or 718 of FIG. 7 and at least blocks 802 and/or 804 of FIG. 8. In some examples, the executable instructions of blocks 706, 708, and/or 718 of FIG. 7 and blocks 802 and/or 804 of FIG. 8 may be executed on at least one processor such as the example processor 1112 of FIG. 11. In other examples, the means for determining durations is implemented by hardware logic, hardware implemented state machines, logic circuitry, and/or any other combination of hardware, software, and/or firmware. For example, the means for determining durations may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In FIG. 5, the example comparator 510 compares determined durations to a threshold duration to assist in identifying whether a location cluster corresponds to an area of media exposure or an area of transit. The comparator 510 includes a threshold duration. The threshold duration is indicative of a minimum amount of time to associate a location (e.g., a location cluster) with an area of media exposure. For example, the threshold duration enables the mapping controller 512 to generate a map of the media exposure areas in the media presentation environment 104 based on selected location clusters having respective thresholds that meet or exceed the threshold duration. Through proper configuration of the threshold duration, the selected location clusters will be representative of locations where the panelist 106 has lingered, sat, stood, or otherwise remained for a long enough period of time to have been meaningfully exposed to media. In some examples, an administrator of the central facility 114 provides a threshold duration to the comparator 510. For example, the administrator determines what a minimum amount of time should be for a location cluster to be indicative of a location where a panelist (e.g., the panelist 106) was exposed to media (e.g., 5 minutes, 10 minutes, 15 minutes, etc.). In some examples, the comparator 510 assigns the location cluster as a cluster and/or group to be used for media exposure map generation. In other examples, the comparator 510 notifies the location grouping controller 506 to assign the location cluster as a cluster and/or group to be used for media exposure map generation. In some examples, the comparator 510 and/or the location grouping controller 506 stores the location cluster in the third datastore 504 with a tag that identifies the location cluster as one to be used for media exposure map generation. Therefore, the cluster data 507 includes information to be used by the example mapping controller 512.

The example comparator 510 implements means for comparing and/or comparing means. For example, the means for comparing may be implemented by executable instructions such as that implemented by at least blocks 710 and/or 712 of FIG. 7. In some examples, the executable instructions of blocks 710 and/or 712 of FIG. 7 may be executed on at least one processor such as the example processor 1112 of FIG. 11. In other examples, the means for comparing is implemented by hardware logic, hardware implemented state machines, logic circuitry, and/or any other combination of hardware, software, and/or firmware. For example, the means for comparing may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In FIG. 5, the example mapping controller 512 generates media exposure maps 509 based on location clusters in the cluster data 507 that meets and/or exceeds the threshold duration and monitored data 513 that have timestamps corresponding to timestamps of the cluster data 507. The example mapping controller 512 obtains location clusters of the cluster data 507 from the example third datastore 504 in response to the example comparator 510 determining that the location clusters have respective durations that meet and/or exceed the threshold duration. The example mapping controller 512 is to map the location clusters to form a media exposure map when the clusters have timestamps corresponding to timestamps of monitored data 513. In some examples, the mapping controller 512 plots a media exposure map in a diagram of a media presentation environment. For example, the mapping controller 512 generates and overlays a media exposure map in a diagram of the media presentation environment 104 that includes the media device 110, the panelists 106, 107, and 108, the device meter 102, the personal meter 126, etc. Such a media exposure map and/or media exposure maps are described in further detail below in connection with FIG. 6.

In some examples, the mapping controller 512 generates media exposure maps based on the monitored data 513 and the angle data 515. For example, the mapping controller 512 may not obtain a response from the comparator 510 corresponding to the different durations of the different clusters of locations, but instead may analyze angle data 515 in view of the monitored data 513. The example mapping controller 512 can generate a media exposure map based on identifying whether angles of the angle data 515 include a corresponding monitored data (e.g., watermark, signature, etc.). For example, the mapping controller 512 determines whether a timestamp of an angle collected and/or determined by the personal meter 126 matches a timestamp of a watermark or generated signature collected by the device meter 102. In some examples, the mapping controller 512 determines that angles corresponding to certain areas (e.g., locations) have timestamps within and/or satisfying a threshold amount of time from timestamps of monitored data 513 and, thus, defines that area as a media exposure area. In other examples, the mapping controller 512 determines that angles corresponding to certain areas (e.g., locations) do not have timestamps matching and/or meeting a threshold of matching timestamps of monitored data 513 and, thus, defines that area as a non-media exposure area. The example mapping controller 512 generates an outline of a map based on the angles corresponding to areas where the device meter 102 collected monitored data 513.

Figure 6:
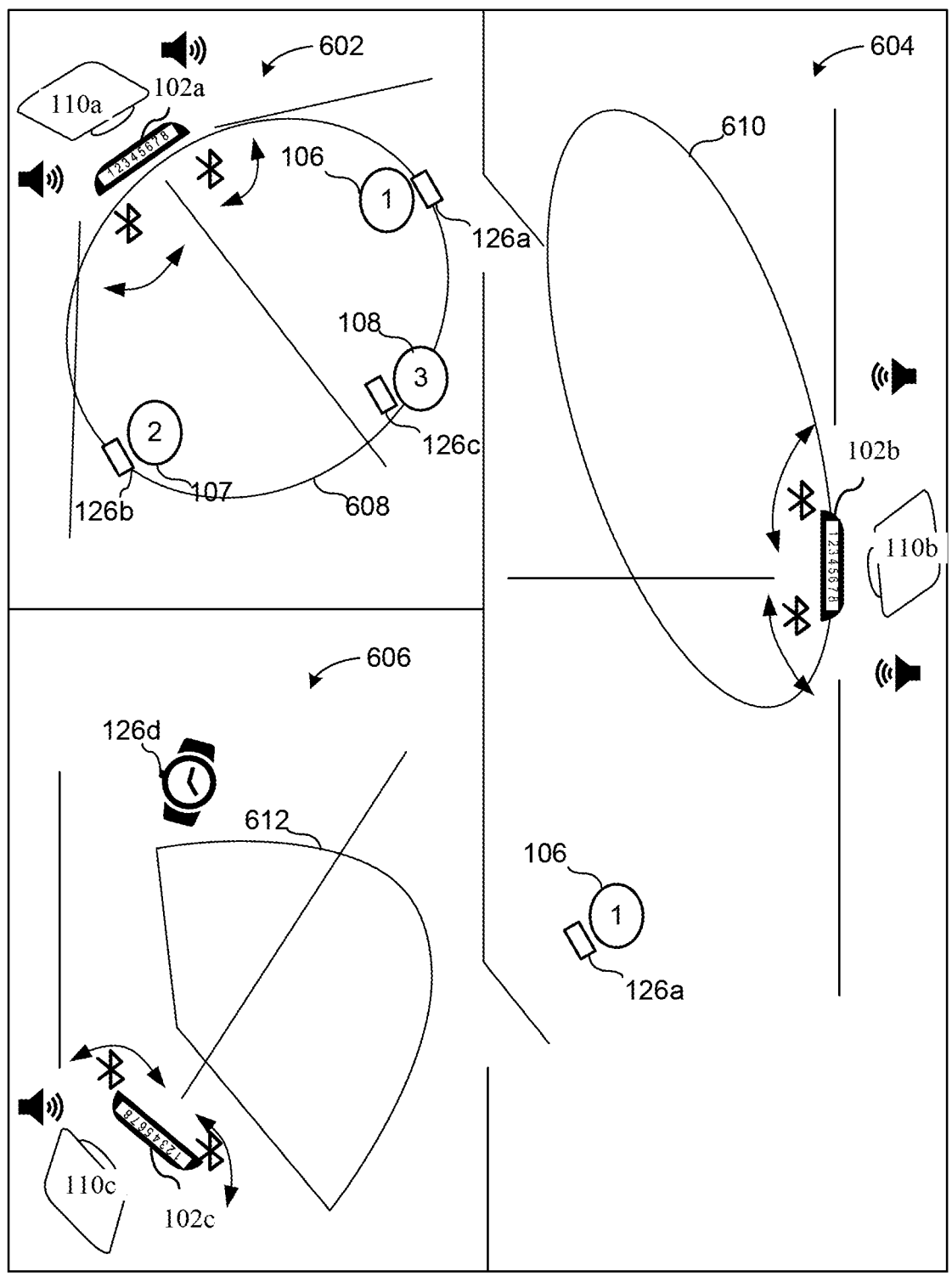
FIG. 6 is a diagram of an example household including media exposure maps.

Turning to FIG. 6, an example household diagram 600 is illustrated. The example household diagram 600 represents a panelist household having multiple rooms. The example household diagram 600 includes a first media presentation environment 602, a second media presentation environment 604, and a third media presentation environment 606.

In FIG. 6, the first media presentation environment 602 corresponds to the media presentation environment 104 of FIG. 1. In some examples, the first media presentation environment 602 and/or the media presentation environment 104 of FIG. 1 is a living room in the household diagram 600. For example, the first media presentation environment 602 includes the first panelist 106, the second panelist 107, and the third panelist 108. In FIG. 6, the first panelist 106 includes a first personal meter 126a, the second panelist 107 includes a second personal meter 126b, and the third panelist 108 includes a third personal meter 126c. The first media presentation environment 602 includes a first device meter 102a and a first media device 110a. In some examples, the first device meter 102a, the first personal meter 126a, the second personal meter 126b, and the third personal meter 126c support angle of arrival and angle of departure measurements. In some examples, the first personal meter 126a, the second personal meter 126b, and the third personal meter 126c are in communication with the first device meter 102a to determine location data 212, 312, and/or 505.

In FIG. 6, the household diagram 600 includes the second media presentation environment 604. In some examples, the second media presentation environment 604 corresponds to a kitchen. The example second media presentation environment 604 includes an example second device meter 102b and an example second media device 110b. In some examples, the second device meter 102b is configured to be coupled to the second media device 110b to monitor media and panelists' locations. In some examples, the second device meter 102b supports angle of arrival and angle of departure measurements.

In FIG. 6, the household diagram 600 includes the third media presentation environment 606. In some examples, the third media presentation environment 606 corresponds to a bedroom. The example third media presentation environment 606 includes an example third device meter 102c, an example third media device 110c, and an example fourth personal meter 126d. In some examples, the third device meter 102c is configured to be coupled to the third media device 110c to monitor media and panelists' locations. In some examples, the third device meter 102c supports angle of arrival and angle of departure measurements.

In FIG. 6, the example first media presentation environment 602 includes an example first media exposure map 608, the example second media presentation environment 604 includes an example second media exposure map 610, and the example third media presentation environment 606 includes an example third media exposure map 612. In some examples, the central facility 114 generates the first media exposure map 608, the second media exposure map 610, and the third media exposure map 612. In FIG. 6, the media exposure maps are illustrated as heat maps. However, the example central facility 114 can generate any type of map to indicate media exposure areas of the household diagram 600. In an example first operation, the mapping controller 512 obtains a first location cluster corresponding to the location point of the first personal meter 126a, a second location cluster corresponding to the location point of the second personal meter 126b, and a third location cluster corresponding to the location point of the third personal meter 126c. Each of the first, second, and third location clusters have durations that meet and/or exceed the threshold duration. For example, the first panelist 106 viewed media from the same location for 10 minutes, the second panelist 107 viewed media from the same location for 30 minutes, and the third panelist 108 viewed media from the same location for an hour. In some examples, the threshold duration is 1 minute and, thus, the durations corresponding to the first location cluster, the second location cluster, and the third location cluster exceed the threshold. The example monitored data detector 516 obtains monitored data corresponding to the first personal meter 126a, the second personal meter 126b, and the third personal meter 126c. The example monitored data detector 516 is to compare timestamps of the monitored data to timestamps of the location clusters. In some examples, the monitored data detector 516 is to determine whether the location clusters correspond to a time when the first personal meter 126a, the second personal meter 126b, the third personal meter 126c, and/or the first device meter 102a obtained a watermark, generated a signature, and/or received an indication of media data. The example monitored data detector 516 does not attempt to match the timestamps of the location clusters to the timestamps of the monitored data, but instead determines whether they are within a threshold amount of time from each other. For example, the threshold amount of time is set to 30 seconds and the second location cluster is associated with a time duration of 5:00 pm to 5:05 pm. The monitored data was obtained and/or generated by the second personal meter 126b and/or the first device meter 102a at 4:59:30 pm, 5:01:06 pm, 5:03:20 pm, and 5:05:30 pm. The example monitored data detector 516 determines that the second location cluster includes timestamps meeting the threshold amount of time. In this example, the monitored data detector 516 notifies the mapping controller 512. In such an example, the mapping controller 512 maps and/or otherwise connects the first location cluster, the second location cluster, and the third location cluster to form and/or generate the first media exposure map 608. Overtime, as the panelists 106, 107, and 108 move throughout the first media presentation environment 602 and new locations and durations are determined, the mapping controller 512 may update, modify, and/or adjust the media exposure map in the household diagram 600.

For example, the household diagram 600 illustrates that the first panelist 106 is in two locations, the first media presentation environment 602 and the second media presentation environment 604. In some examples, the central facility 114 determines that the first panelist 106 moved from the first media presentation environment 602 to the second media presentation environment 604 based on location data corresponding to the first personal meter 126a. In some examples, the central facility 114 does not care how the first panelist 106 moves from one location to the next, but cares about how long (e.g., the duration) the first panelist 106 is in each location and if they are in a location where media monitored data can be/is received/generated. The example central facility 114 uses the duration to determine if the panelist 106 is walking, sitting, standing, and ultimately, exposed to media or not exposed to media. In FIG. 6, at the time the first panelist 106 is in the second media presentation environment 604, the central facility 114 determines that the first panelist 106 is just transiting the second media presentation environment 604 due to the duration and a lack of monitored media data. In such an example, the mapping controller 512 does not include the location of the first panelist 106 in the second media presentation environment 604 in the second media exposure map 610.

In FIG. 6, the example first media exposure map 608 is an approximately circular shape that outlines and encloses where the panelists 106, 107, and 108 are exposed to (e.g., view) the media presented via the first media device 110a. The example second media exposure map 610 is an oval shape that outlines and encloses where the panelists 106, 107, and 108 are exposed to (e.g., view) the media presented via the second media device 110b. The example third media exposure map 612 is a circular shape that outlines and encloses where the panelists 106, 107, and 108 are exposed to (e.g., view) the media presented via the third media device 110c. In some examples, the media exposure maps 608, 610, and 612 are overlayed on the household diagram 600 to illustrate to an administrator of the central facility 114 where the panelists typically view and/or are exposed to media and where they do not. This information is useful in subsequent processing of media data to determine whether an impression of media or media exposure data is accurate for a panelist having a particular location in the household.

In an example second operation, the mapping controller 512 obtains a first angle corresponding to the angle of the first personal meter 126a to the first device meter 102a, a second angle corresponding to the angle of the second personal meter 126b to the first device meter 102a, and a third angle corresponding to the angle of the third personal meter 126c to the first device meter 102a. The example mapping controller 512 determines that each of the first, second, and third angles have a timestamp that within a time window of timestamps corresponding to monitored data. The time window may be determined by an administrator of the central facility 114 such that the administrator determines how much time between a monitored data timestamp and an angle timestamp indicates that the panelist was exposed to media while in that angle. In some examples, the time window can be indicative of seconds (e.g., 2 seconds, 10 seconds, 30 seconds, etc.). In some examples, the time window can be indicative of minutes (e.g., 1 minute). In an example, the first device meter 102a may have determined an angle of the first personal meter 126a and the first personal meter 126a may have collected a watermark from the first media device 110a, wherein the angle and the watermark occur within a window of time. The example first device meter 102a may have determined an angle of the second personal meter 126b and the second personal meter 126b may have collected a watermark from the first media device 110a, wherein the angle and the watermark occur within the time window. The example first device meter 102a may have generated an angle of the third personal meter 126c and the third personal meter 126c may have collected a watermark (e.g., a code) from the first media device 110a wherein the angle and the watermark occur within the time window.

In such an example, the mapping controller 512 generates an outline of a map based on the first angle, the second angle, and the third angle to generate the first media exposure map 608. Overtime, as the panelists 106, 107, and 108 move throughout the first media presentation environment 602 and new angles are determined, the mapping controller 512 may update, modify, and/or adjust the media exposure map in the household diagram 600.

In an example third operation, the first device meter 102a and the third device meter 102c obtain direction finding enabled packets from the fourth personal meter 126d and utilize AoA and/or AoD features to estimate the angle of the fourth personal meter 126d. The example location grouping controller 506 may obtain the angle data from the respective first device meter 102a and third device meter 102c and determine a location of the fourth personal meter 126d. For example, the location grouping controller 506 may utilize triangulation to determine the position of the fourth personal meter 126d. The example location grouping controller 506 may have information corresponding to where the first device meter 102a and the third device meter 102c are located and utilize that information to identify the position of the fourth personal meter 126d. In some examples, the angle data, corresponding to the fourth personal meter 126d, includes similar and/or equivalent timestamps. In some examples, the angle data includes timestamps of when the fourth personal meter 126d transmitted the direction finding enabled packets and, thus, the location grouping controller 506 can determine that the first device meter 102a and the third device meter 102c estimated angle data of the fourth personal meter 126d from the same direction finding packet.

In the example third operation, the monitored data detector 516 obtains monitored data corresponding to the fourth personal meter 126d. The example monitored data detector 516 is to compare timestamps of the monitored data to timestamps of the estimated location. In some examples, the monitored data detector 516 is to determine whether the location corresponds to a time when the fourth personal meter 126c, the first device meter 102a, and/or the third device meter 102c obtained a watermark, generated a signature, and/or received an indication of media data.

The example monitored data detector 516 determines that the location includes a timestamp meeting the threshold amount of time. In this example, the monitored data detector 516 notifies the mapping controller 512. In such an example, the mapping controller 512 maps and/or otherwise adds the location to the third media exposure map 612.

Returning to FIG. 5, the example mapping controller 512 may utilize any type of mapping algorithm to generate the media exposure maps 509. For example, the mapping controller 512 supports data mapping analysis features, heat mapping features, etc., to generate the media exposure maps 509 for media presentation environments. In some examples, the mapping controller 512 stores the media exposure maps 509 in the example third datastore 504.

The example mapping controller 512 implements means for generating media exposure maps, means for generating maps, means for mapping, and/or media exposure mapping means. For example, the means for generating maps may be implemented by executable instructions such as that implemented by at least block 722 of FIG. 7. In some examples, the executable instructions of block 722 of FIG. 7 may be executed on at least one processor such as the example processor 1112 of FIG. 11. In other examples, the means for generating maps is implemented by hardware logic, hardware implemented state machines, logic circuitry, and/or any other combination of hardware, software, and/or firmware. For example, the means for generating maps may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In FIG. 5, the example model training handler 514 is to train a machine learning model to learn panelist behavior based on location data 505, cluster data 507, and monitored data 513. In some examples, the model training handler 514 selects location data, cluster data, and media monitoring data (e.g., monitored data) for a panelist household to process for training of an ML model, such as the ML model(s) 511. For example, the model training handler 514 retrieves location data 505, cluster data 507, and monitored data 513, which may be labelled training data by the example location grouping controller 506, the example duration identifying controller 508, and/or the example monitored data detector 516, corresponding to the media presentation environment 104 of FIG. 1. In other examples, the model training handler 514 selects angle data 515 and monitored data 513 for a panelist household to process for training of an ML model, such as the ML model(s) 511. For example, the model training handler 514 retrieves angle data 515 and monitored data 513, which may be labelled training data by the example mapping controller 512, the example third interface 502, the example monitored data detector 516, and/or the example device meter 102 and personal meter 126.

In some examples, the model training handler 514 generates a trained ML model based on at least one of location data 505, duration data, monitored data 513, angle data 515, and/or label(s). For example, the model training handler 514 may generate and/or otherwise output trained versions of the ML model(s) 511. In some examples, the model training handler 514 may generate the ML model(s) 511 based on locations and corresponding time durations of panelists in a household. In some examples, the model training handler 330 may generate the ML model(s) 511 based on a label that is assigned to the location data 505. In some examples, the model training handler 514 may generate the ML model(s) 511 based on cluster data 507, corresponding time durations, and monitored data having timestamps within the corresponding time durations. In some examples, the model training handler 514 may generate the ML model(s) 511 based on angle data 515 and monitored data 513. In some examples, the model training handler 514 may generate the ML model(s) 511 to predict a probability that, when a particular angle of arrival measurement and/or angle of departure measurement is determined, a panelist will be exposed to media. For example, the model training handler 514 may generate the ML model(s) 511 to predict a probability that a panelist and/or panelists will be exposed to media when they are in a particular location and/or location cluster. In some examples, the model training handler 514 may generate the ML model(s) 511 to predict a probability that at a specific time of day, the panelist is going to walk and/or move from one media presentation environment to a different media presentation environment. In some examples, the model training handler 514 may generate the ML model(s) 511 to predict a probability that multiple panelists (e.g., panelists 106, 107, and 108) are going to be exposed to media from a particular media device at a particular time of day.

In some examples, the model training handler 514 implements example means for training a machine learning model, which may be executed to determine panelist behavior based on location data 505, cluster data 507, monitored data 513, and/or angle data 515. For example, the means for training a machine learning model may be implemented by executable instructions such as that implemented by at least blocks 806, 808, and/or 810 of FIG. 8. In some examples, the executable instructions of blocks 806, 808, and/or 810 of FIG. 8 may be executed on at least one processor such as the example processor 1112 of FIG. 11. In other examples, the means for training a machine learning model is implemented by hardware logic, hardware implemented state machines, logic circuitry, and/or any other combination of hardware, software, and/or firmware. For example, the means for training a machine learning model may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In FIG. 5, the example monitored data detector 516 is to detect whether a watermark was collected and/or a signature was generated within a time window that an angle was generated for use by a particular meter (e.g., the personal meter 126), that a location was generated by the particular meter, and/or that falls within a time duration and/or time window corresponding to a cluster of a particular media exposure environment. For example, the monitored data detector 516 analyzes monitored data 513 for timestamps then compares the timestamps to time durations of the clusters in the cluster data 507. In some examples, the monitored data 513 are mapped, by the third datastore 504, to their respective meter identifiers. For example, monitored data 513 may correspond to media monitoring data from a number of meters from one or more media sites (e.g., households, etc.). Therefore, monitored data 218 may be included in a larger dataset, such as included in monitored data 513, and is differentiated from other monitored data by having a mapping to a meter identifier for the device meter 102. In such an example, the monitored data detector 516 notifies the mapping controller 512 that a cluster is relevant (e.g., that the cluster can be used for generating a media exposure map) when monitored data have timestamps falling between the time durations of the clusters. In such examples, the monitored data detector 516 assigns clusters as exposure clusters and/or non-exposure clusters based on whether the clusters can be used for generating media exposure maps. In such examples, the monitored data detector 516 stores the assigned clusters in the third datastore 504. Such assigned clusters can be represented by the cluster data 507. In some examples, the monitored data detector 516 is to analyze monitored data 513 for timestamps and compare those timestamps to timestamps corresponding to location data 505. In such examples, the monitored data detector 516 assigns locations as exposure locations and/or non-exposure locations based on whether the locations can be used for generating media exposure maps. In such examples, the monitored data detector 516 stores the assigned locations in the third datastore 504. Such assigned locations can be represented by the location data 505. In some examples, the monitored data detector 516 notifies the location grouping controller 506 that a location is relevant (e.g., that a location can be used to generate a cluster) when monitored data have timestamps falling within the time window and/or meeting a threshold time from the timestamps corresponding to the location data. In some examples, the threshold time between monitored data timestamps and timestamps corresponding to location data may be determined by an administrator of the central facility 114 and could be 30 seconds, one minute, five minutes, and/or any value of time that would indicate a panelist was exposed to media in a particular location.

In some examples, the monitored data detector 516 is to identify ones of the monitored data 513 that have timestamps falling within a time window and/or meeting the threshold time from the timestamps of the ones of the angle data 515. In some examples, the monitored data detector 516 obtains monitored data 318 from the example personal meter 126 of FIG. 3 and uses the monitored data 318 as a reference when determining whether an angle should be used to generate a media exposure map. For example, the monitored data detector 516 compares a timestamp of an angle measurement to a list of monitored data timestamps to identify whether the angle measurement is relevant (e.g., whether the angle measurement can be used to generate a media exposure map). In some examples, the monitored data detector 516 assigns angles as exposure angles (e.g., with a label, tag, etc.) when the angles have timestamps that fall within the time window and/or meet the threshold time from at least one monitored data timestamp. In other examples, the monitored data detector 516 assigns angles as non-exposure area angles (e.g., with a label, tag, etc.) when the angles do not have timestamps falling within the time window and/or meeting the threshold time from at least one monitored data timestamp. In such examples, the monitored data detector 516 stores the assigned angles in the third datastore 504. Such assigned angles can be represented by the angle data 515. In some examples, the mapping controller 512 retrieves such assigned angle data 515 to generate media exposure maps. In some examples, the model training handler 514 retrieves assigned angle data 515 to train ML model(s) 511.

The example monitored data detector 516 implements means for identifying a media exposure location, a media exposure cluster, and/or a media exposure angle, means for detecting that monitored data corresponds to an angle, a location, and/or a cluster, and/or detecting means. For example, the means for detecting monitored data may be implemented by executable instructions such as that implemented by at least blocks 714, 716, and/or 718 of FIG. 7 and at least block 802 of FIG. 8. In some examples, the executable instructions of blocks 714, 716, and/or 718 of FIG. 7 and at least block 802 of FIG. 8 may be executed on at least one processor such as the example processor 1112 of FIG. 11. In other examples, the means for detecting code is implemented by hardware logic, hardware implemented state machines, logic circuitry, and/or any other combination of hardware, software, and/or firmware. For example, the means for detecting code may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

While an example manner of implementing the central facility 114 of FIG. 1 is illustrated in FIG. 5, one or more of the elements, processes and/or devices illustrated in FIG. 5 may be combined, divided, re-arranged, omitted, eliminated and/or implemented in any other way. Further, the example third interface 502, the example third datastore 504, the example location grouping controller 506, the example duration identifying controller 508, the example comparator 510, the example mapping controller 512, the example model training handler 514, the example monitored data detector 516, and/or, more generally, the example central facility of FIG. 1 may be implemented by hardware, software, firmware and/or any combination of hardware, software and/or firmware. Thus, for example, any of the example third interface 502, the example third datastore 504, the example location grouping controller 506, the example duration identifying controller 508, the example comparator 510, the example mapping controller 512, the example model training handler 514, the example monitored data detector 516, and/or, more generally, the example central facility of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example third interface 502, the example third datastore 504, the example location grouping controller 506, the example duration identifying controller 508, the example comparator 510, the example mapping controller 512, the example model training handler 514, and/or the example monitored data detector 516 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 114 of FIG. 1 may include one or more elements, processes and/or devices in addition to, or instead of, those illustrated in FIG. 5, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the device meter 102 of FIGS. 1 and 2 are shown in FIGS. 4A and 4B. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4A and 4B, many other methods of implementing the example device meter 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Flowcharts representative of example hardware logic, machine readable instructions, hardware implemented state machines, and/or any combination thereof for implementing the personal meter 126 of FIGS. 1 and 3 are shown in FIG. 4C. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 4C, many other methods of implementing the example personal meter 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 7:
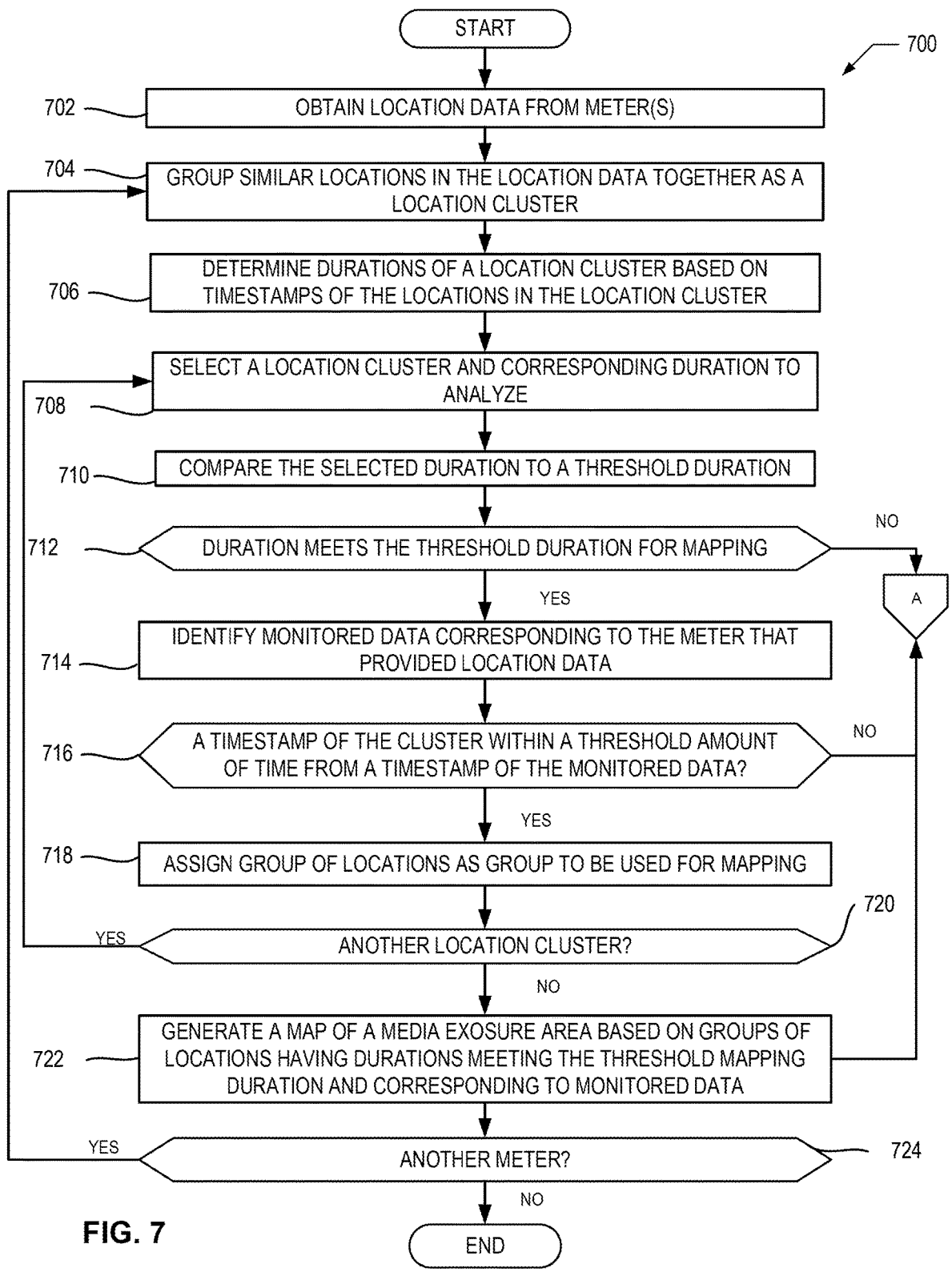
FIG. 7 is a flowchart representative of machine readable instructions which may be executed to implement the central facility of FIGS. 1 and 5 to generate media exposure maps based on location data.
Figure 8:
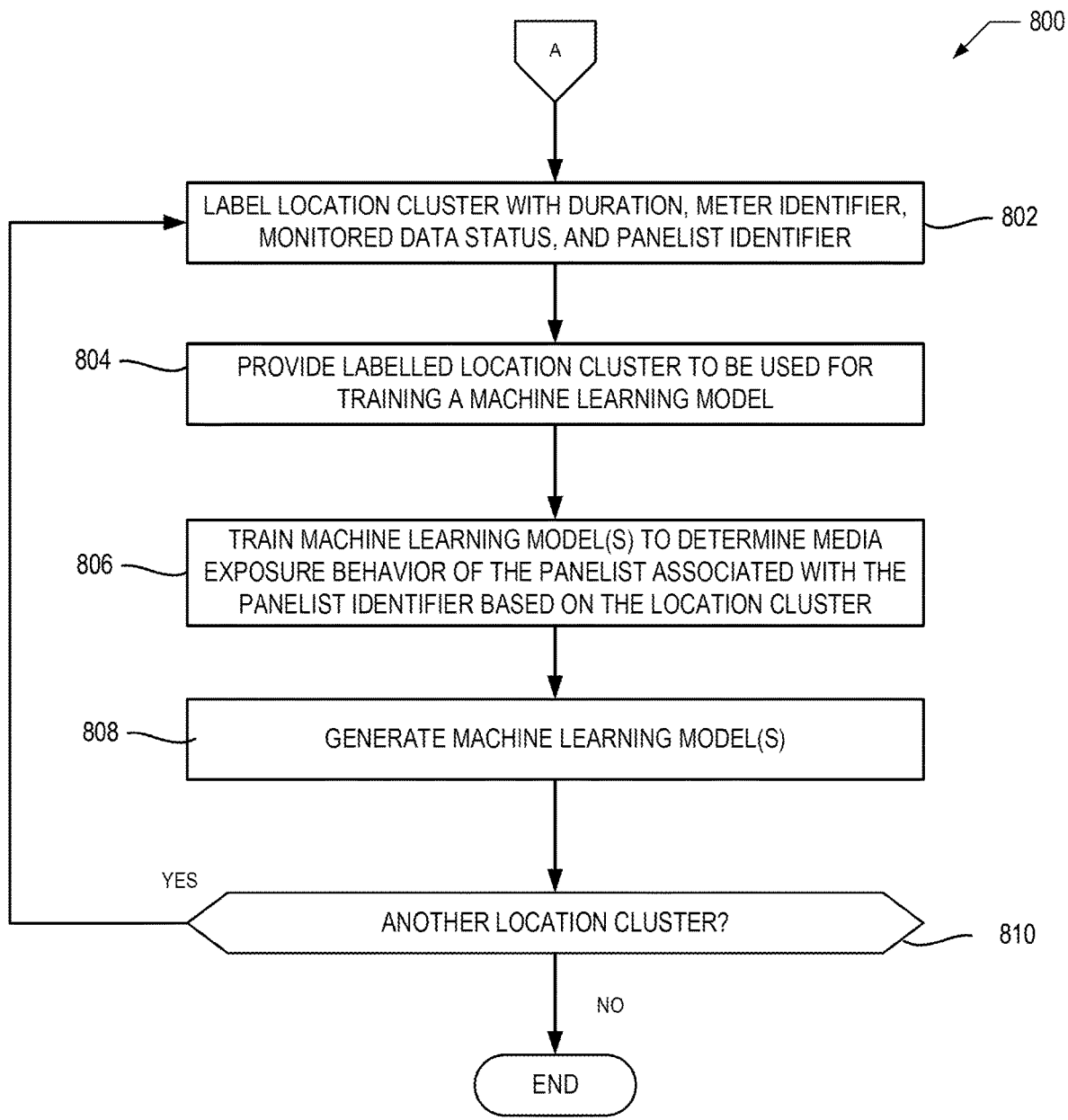
FIG. 8 is a flowchart representative of machine readable instructions which may be executed to implement the central facility of FIGS. 1 and 5 to train a machine learning model to predict media exposure behavior.

Flowcharts representative of example hardware logic, machine readable instructions, hardware implemented state machines, and/or any combination thereof for implementing the central facility 114 of FIG. 1 are shown in FIGS. 7 and 8. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 7 and 8, many other methods of implementing the example central facility 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4A, 4B, 4C, 7, and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIGS. 7 and 8 are flowcharts representative of machine readable instructions which may be executed to implement the central facility 114 of FIGS. 1 and 5 to generate media exposure maps and/or training machine learning model(s) based on location data.

Turning to FIGS. 4A and 4B, the example angle and location estimating program 400A is described to implement the device meter 102 of FIGS. 1 and 2. The angle and location estimating program 400A includes block 402 where the device meter 102 monitors for packets. For example, the first interface 202 monitors for incoming direction finding enabled packets.

The example device meter 102 determines the mode of direction finding (block 404). For example, the first interface 202 analyzes an information element (e.g., bit, flag, etc.) in the packet corresponding to direction finding to determine if the packet corresponds to calculating AoA, calculating AoD, etc.

The example device meter 102 determines whether the mode is indicative of angle of arrival (block 406). For example, the first interface 202 determines whether the information element in the packet includes is indicative of angle of arrival.

In some examples, when the device meter 102 determines the mode is indicative of AoA (e.g., block 406 returns a value YES), the example device meter 102 obtains the IQ samples from the packets (block 408). For example, the first angle of arrival controller 206 extracts IQ samples from packets to estimate the angles.

The example device meter 102 determines the angle of arrival based on the IQ samples (block 410). For example, the first angle of arrival controller 206 utilizes the IQ samples to calculate a phase difference in the signal carrying the packets (e.g., the radio signal) by utilizing different elements of an antenna array. In some examples, the first angle of arrival controller 206 utilizes the phase difference to determine the angle of arrival.

The example device meter 102 determines location data corresponding to the example personal meter 126 based on the angle data (block 412). For example, the first location generation controller 210 utilizes the angle measurement to determine a relative position of the personal meter 126 from the device meter 102. In some examples, the first location generation controller 210 utilizes triangulation to determine the position of the personal meter 126. In other examples, the first location generation controller 210 utilizes any type of positioning algorithm to generate location data corresponding to the personal meter 126.

The example device meter 102 stores the location data with a timestamp (block 414). For example, the first location generation controller 210 stores the location data (e.g., location data 212) at the first datastore 204 with corresponding times at which the direction finding enabled packets, corresponding to the location data, were sent to the device meter 102.

The example device meter 102 determines whether there is another packet (block 416). For example, the first interface 202 determines whether more packets are being sent that have not yet been analyzed by the device meter 102. In some examples, when the device meter 102 determines that there is another packet to analyze (e.g., block 416 returns a value YES), control returns to block 404.

In some examples, when the device meter 102 determines that there is not another packet to analyze (e.g., block 414 returns a value NO), the device meter 102 provides the location data and angle data to the central facility 114 (block 418). For example, the first interface 202 sends the location data and angle data to the central facility 114 for subsequent processing, to generate a media exposure map.

In some examples, when the device meter 102 determines the mode is not indicative of AoA (e.g., block 406 returns a value NO), the example device meter 102 determines whether the mode is indicative of angle of departure (block 420). For example, the first interface 202 analyzes the information element in the packet to determine whether the mode is indicative of angle of departure.

In some examples, when the device meter 102 determines the mode is not indicative of AoD (e.g., block 420 returns a value NO), control returns to block 402. For example, the first interface 202 determines to not invoke the first angle of arrival controller 206 and/or the first angle of departure controller 208.

In some examples, when the device meter 102 determines the mode is indicative of AoD (e.g., block 420 returns a value YES), the example device meter 102 obtains the IQ samples from the packets (block 422). For example, the first angle of departure controller 208 extracts IQ samples from packets to estimate the angles.

The example device meter 102 determines the angle of departure based on the IQ samples (block 424). For example, the first angle of departure controller 208 utilizes the IQ samples to detect propagation delays in the signal carrying the packets (e.g., the radio signal) between transmitting elements of the multiple antennas of the transmitting device (e.g., the personal meter 126) and the single antenna of the receiving device (e.g., the device meter 102).

Control turns to block 412 when the example device meter 102 determines the angle measurements. In some examples, the angle and location estimating program 400A may be repeated when direction finding enabled packets are obtained by the device meter 102.

In some examples, when the device meter 102 determines that there is not another packet to analyze (e.g., block 416 returns a value NO), control turns to FIG. 4B, where the device meter 102 monitors for media (block 426). For example, the media identifying controller 216 monitors for media identifying data in audio and/or video obtained by the first interface 202. In some examples, the media identifying data includes watermarks detected in the media and that identify the media presented via the media device 110 of FIG. 1. In some examples, the media identifying data includes signatures generated from characteristics of the media presented via the media device 110 of FIG. 1. In some examples, the media identifying controller 216 monitors for media identifying data in parallel to estimating angle data.

The example device meter 102 determines monitored data (block 428). For example, the media identifying controller 216 outputs monitored data including watermarks detected in the audio and/or video obtained at the first interface 202 and/or signature generated from the audio and/or video obtained at the first interface 202.

The example device meter 102 stores monitored data with timestamps (block 430). For example, the media identifying controller 216 stores the watermarks and/or signatures in the first datastore 204 with a timestamp corresponding to when the first interface 202 obtained the media.

The example device meter 102 determines whether to continue monitoring for media (block 432). For example, the media identifying controller 216 may monitor media obtained at the first interface 202 for intervals of time. Such intervals of time may include monitoring for watermarks and/or generates signatures every 10 minutes, every hour, once a day, a couple times a week, etc. In some examples, the media identifying controller 216 monitors for watermarks and/or generates signatures in aperiodic intervals (randomly) based on when device meter 102 is in an area of interest (e.g., a viewing area), detects media, etc.

In some examples, when the device meter 102 determines to continue monitoring for media (e.g., block 432 returns a value YES), control returns to block 426. For example, the media identifying controller 216 continues to attempt to detect watermarks in audio and/or video data and/or generates query signatures for comparing and/or matching with reference signatures.

In some examples, when the device meter 102 determines to not continue monitoring for media (e.g., block 432 returns a value NO), the device meter 102 transmits the stored information to the central facility 114 (block 434). For example, the first interface 202 transmits the monitored data (e.g., monitored data 218) to the central facility 114 for further processing. Such further processing is described in further detail below in connection with FIG. 5.

Turning to FIG. 4C, the packet transmitting program 400B of FIG. 4B begins at block 436, where the personal meter 126 transmits direction finding enabled packets. For example, the second interface 302 transmits direction finding enabled packets to the device meter 102 to determine its location.

The example personal meter 126 determines whether to transmit another packet (block 438). For example, the second interface 302 determines whether the personal meter 126 has relocated and a new location is to be determined, whether a periodic time period is up, whether an aperiodic time period is up, etc.

In some examples, if the personal meter 126 determines to transmit another direction finding enabled packet (e.g., block 438 returns a value YES), control returns to block 436.

In some examples, if the personal meter 126 determines to not transmit another direction finding enabled packet (e.g., block 438 returns a value NO), the packet transmitting program 400B ends. The program 400B of FIG. 4C may repeat when the personal meter 126 transmits new direction finding enabled packets.

The program 700 of FIG. 7 is to implement the central facility 114 of FIGS. 1 and 5 to generate media exposure maps. The program 700 of FIG. 7 includes block 702 where the example central facility 114 obtains location data 505 from the meter(s). For example, the third interface 502 obtains location data 212 from the example device meter 102 and/or location data 312 from the example personal meter 126. The example third interface 502 may obtain location data 505 responsive to a trigger sent to the meter(s), a time interval lapsing, etc.

The example central facility 114 groups similar locations in the location data 505 together as a location cluster (block 704). For example, the location grouping controller 506 is to generate cluster data 507 by determining groups within the location data 505 that have similar proximities and/or locations. In some examples, the location grouping controller 506 assigns the locations to a cluster and stores them in the third datastore 504 as cluster data 507.

The example central facility 114 determines durations of a location cluster based on timestamps of the locations in the location cluster (block 706). For example, the duration identifying controller 508 analyzes timestamps corresponding to the locations in the cluster data 507 to determine a duration of the location cluster. In some examples, the duration identifying controller 508 counts the time between timestamps to determine a duration of a location cluster.

The example central facility 114 selects a location cluster and corresponding duration to analyze (block 708). For example, the duration identifying controller 508 selects one of the location clusters in the cluster data 507 to compare the duration of the location cluster to a threshold duration. In some examples, the duration identifying controller 508 iteratively determines durations for location clusters and, thus, automatically selects the current iteration of location cluster and duration to analyze.

The example central facility 114 compares the selected duration to a threshold duration (block 710). For example, the comparator 510 compares the selected duration to the threshold duration to assist in identifying whether a location cluster corresponds to an area of media exposure or an area of passing through/non-media exposure.

The example central facility 114 determines whether the duration meets the threshold duration for mapping (block 712). For example, the comparator 510 determines whether the duration meets the minimum amount of time to associate a location (e.g., a location cluster) with an area of media exposure. In some examples, when the central facility 114 determines that the duration does meet the threshold duration (e.g., block 712 returns a value YES), the central facility 114 identifies monitored data corresponding to the meter that provided the location data (block 714). For example, the monitored data detector 516 is to query the third datastore 504 for monitored data mapped to the device meter 102.

The example central facility 114 determines whether a timestamp of the cluster is within a threshold amount of time from a timestamp of monitored data (block 716). For example, the monitored data detector 516 is to detect whether a watermark was collected and/or a signature was generated within a time window that a location and/or locations of the cluster were generated and/or determined.

In some examples, when the central facility 114 determines the timestamp of the cluster satisfies the threshold amount of time (e.g., block 716 returns a value YES), the central facility 114 assigns the selected location cluster to be used for mapping (block 718). For example, the duration identifying controller 508 and/or the monitored data detector 516 stores the location cluster in the third datastore 504 with a tag identifying that it should be used for generating a media exposure map. In other examples, the duration identifying controller 508 provides the location cluster directly to the mapping controller 512.

The example central facility 114 determines whether another location cluster is to be analyzed (block 720). For example, the duration identifying controller 508 determines whether a new and/or different location cluster of the cluster data 507 includes a duration that is to be processed and/or analyzed. In some examples, when the central facility 114 determines there is another location cluster to analyze (e.g., block 720 returns a value YES), control returns to block 708. For example, the duration identifying controller 508 selects another location cluster having a duration that is to be compared to the threshold duration.

In some examples, when the central facility 114 determines there is not another location cluster to analyze (e.g., block 720 returns a value NO), the example central facility 114 generates a map of a media exposure area based on the location clusters having durations meeting the threshold mapping duration and corresponding to monitored data (block 722). For example, the mapping controller 512 utilizes the location data 505 and the cluster data 507 that have location and clusters of locations being identified as meeting the minimum duration of time and having corresponding monitored data to associate the location and/or location cluster with an area of media exposure. In some examples, the mapping controller 512 maps and/or otherwise connects the location clusters to generate the media exposure map. The media exposure map corresponds to a media presentation environment and, thus, the mapping controller 512 generates the media exposure map for the media presentation environment.

The example central facility 114 determines whether another meter has provided location data (block 724). For example, the third interface 502 obtain location data from different meters corresponding to different media presentation environments. In such examples, when the central facility 114 determines that another meter has provided location data (e.g., block 724 returns a value YES), control returns to block 702.

In some examples, when the central facility 114 determines that another meter has not provided location data (e.g., block 724 returns a value NO), the program 700 ends. The program 700 may repeat when the example third interface 502 and/or more generally, the example central facility 114, obtains location data from meter(s).

In some examples, when the central facility 114 determines that the selected duration does not meet the threshold duration for mapping (e.g., block 712 returns a value NO), control turns to FIG. 8. In some examples, when the central facility 114 determines that the timestamp of the cluster is not within the threshold amount of time from the timestamp(s) of the monitored data (e.g., block 716 returns a value NO), control turns to FIG. 8. In some examples, when the central facility 114 generates the map of the media exposure area (block 722), control turns to FIG. 8.

FIG. 8 is a flowchart representative of machine readable instructions which may be executed to implement the central facility 114 of FIGS. 1 and 5 to train a machine learning model to predict media exposure behavior. In FIG. 8, the example central facility 114 labels the selected location cluster with the duration, a meter identifier, a monitored data status, and a panelist identifier (block 802). For example, the duration identifying controller 508 assigns a label to the cluster that includes one or more of an identifier of the meter that provided the location data (e.g., the device meter 102 and/or the personal meter 126), an identifier corresponding to the panelist of the personal meter 126 whose location was determined (e.g., the first panelist 106), and the duration and the monitored data detector 516 assigns a label to the cluster that includes a monitored data status (e.g., whether monitored data was found to have a timestamp within a threshold amount of time from a timestamp of the cluster). In some examples, the duration identifying controller 508 executes block 802 regardless of whether the selected duration did not meet the threshold duration.

The example central facility 114 provides the labelled location cluster to be used for training a machine learning model (block 804). For example, the duration identifying controller 508, the monitored data detector 516, and/or the location grouping controller 506 may provide the labelled location cluster to the model training handler 514 for training machine learning model(s) 511. In some examples, the model training handler 514 retrieves the labelled location cluster from the third datastore 504.

The example central facility 114 trains machine learning model(s) to determine media exposure behavior of the panelist associated with the panelist identifier based on the location cluster (block 806). For example, the model training handler 514 may train the ML model(s) 511 to determine a probability that when a particular angle of arrival measurement and/or angle of departure measurement is determined, a panelist will be exposed to media. In other examples, the model training handler 514 may train the ML model(s) 511 to determine a probability that a panelist and/or panelists will be exposed to media when they are in a particular location and/or location cluster. In some examples, the model training handler 514 may train the ML model(s) 511 to determine a probability that at a specific time of day, the panelist is going to walk and/or move from one media presentation environment to a different media presentation environment.

The example central facility 114 generates the machine learning model(s) (block 808). For example, the model training handler 514 outputs and/or stores trained ML model(s) 511 for subsequent use by the central facility 114. In some examples, the model training handler 514 generates updated ML model(s) as new data (e.g., location data, cluster data, media monitoring data, etc.) comes in from the meter(s) (e.g., the device meter 102, the personal meter 126, etc.).

The example central facility 114 determines if there is another location cluster to process (block 8104). For example, the model training handler 514 determines whether there is more training data to train the ML model(s) 511. In some examples, when the central facility 114 determines there is another location cluster to process (e.g., block 810 returns a value YES), control returns to block 802. In some examples, when the central facility 114 determines there is not another location cluster to process (e.g., block 810 returns a value YES), the program 800 ends.

Figure 9:
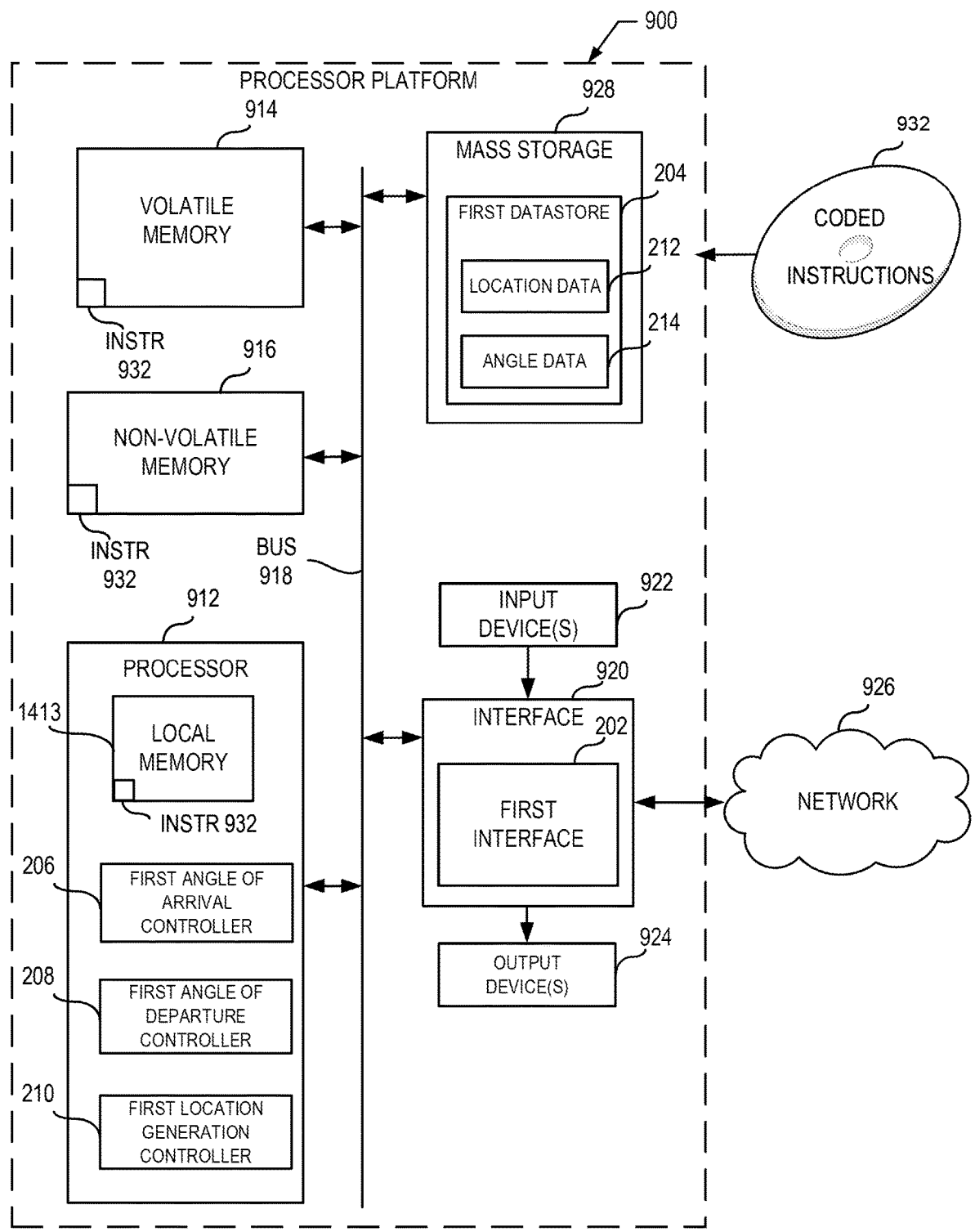
FIG. 9 is a block diagram of an example processing platform structured to execute the instructions of FIG. 4A to implement the meter of FIGS. 1 and 2.

FIG. 9 is a block diagram of an example processor platform 900 structured to execute the instructions of FIGS. 4A and 4B to implement the device meter 102 of FIGS. 1 and 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example first angle of arrival controller 206, the example first angle of departure controller 208, and the example first location generation controller 210.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface. In this example, the interface circuit 920 implements the first interface 202 of FIG. 2.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives. In this example, the one or more mass storage devices 928 implement the example first datastore 204 of FIG. 2, which includes the example location data 212 and the example angle data 214 of FIG. 2.

The machine executable instructions 932 of FIGS. 4A and 4B may be stored in the mass storage device 928, in the volatile memory 914, in the non-volatile memory 916, and/or on a removable non-transitory computer readable storage medium such as a CD or DVD.

Figure 10:
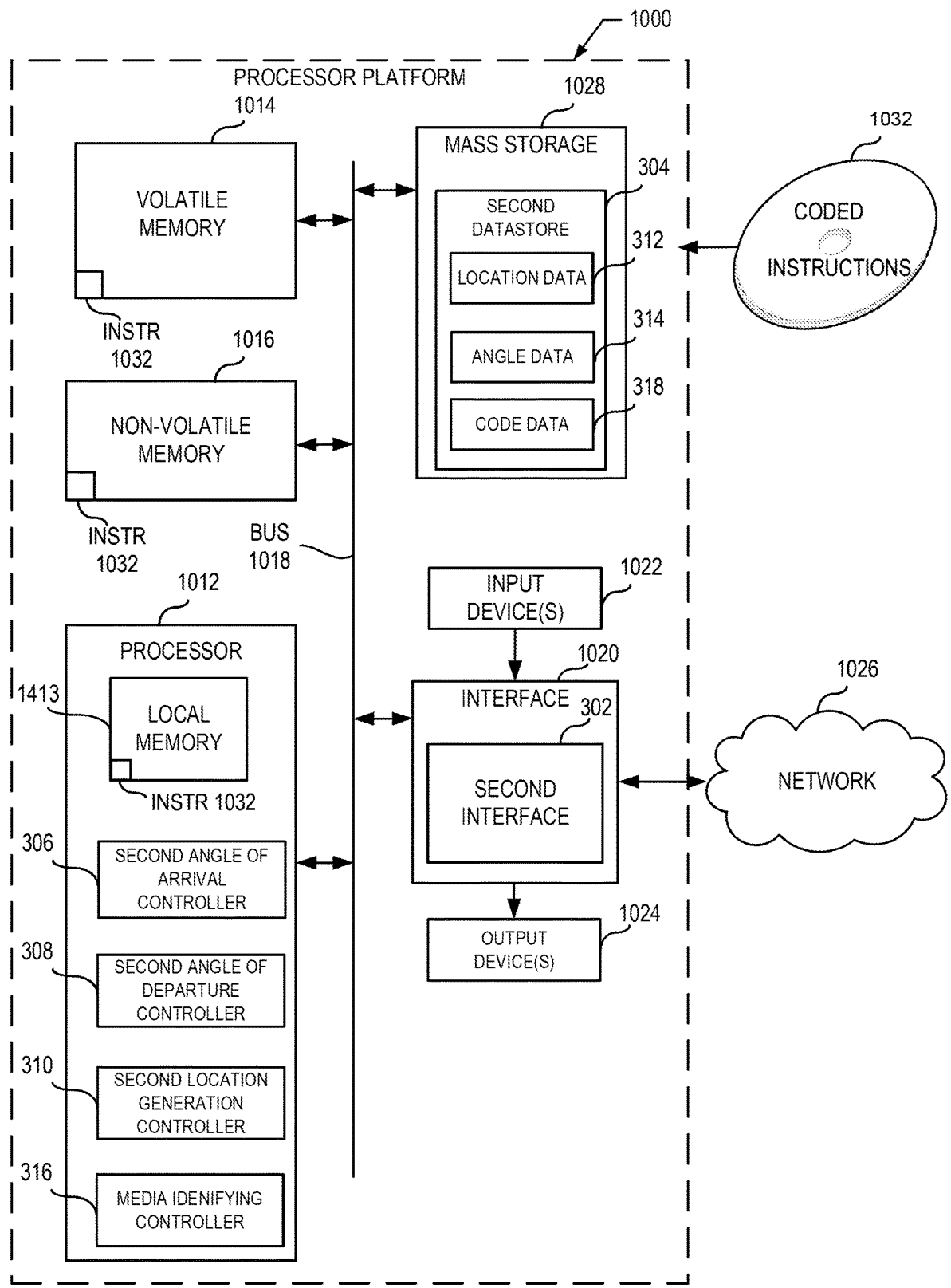
FIG. 10 is a block diagram of an example processing platform structured to execute the instructions of FIGS. 4B and 4C to implement the people meter of FIGS. 1 and 3.

FIG. 10 is a block diagram of an example processor platform 1000 structured to execute the instructions of FIG. 4C to implement the personal meter 126 of FIGS. 1 and 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example second angle of arrival controller 306, the example second angle of departure controller 308, the example second location generation controller 310, and the example media identifying controller 316.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In this example, the interface circuit 1020 implements the example second interface 302 of FIG. 3.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In this example, the one or more mass storage devices 1028 implement the example second datastore 304 of FIG. 3, which includes the example location data 312, the example angle data 314, and the example monitored data 318 of FIG. 3.

The machine executable instructions 1032 of FIG. 4C may be stored in the mass storage device 1028, in the volatile memory 1014, in the non-volatile memory 1016, and/or on a removable non-transitory computer readable storage medium such as a CD or DVD.

Figure 11:
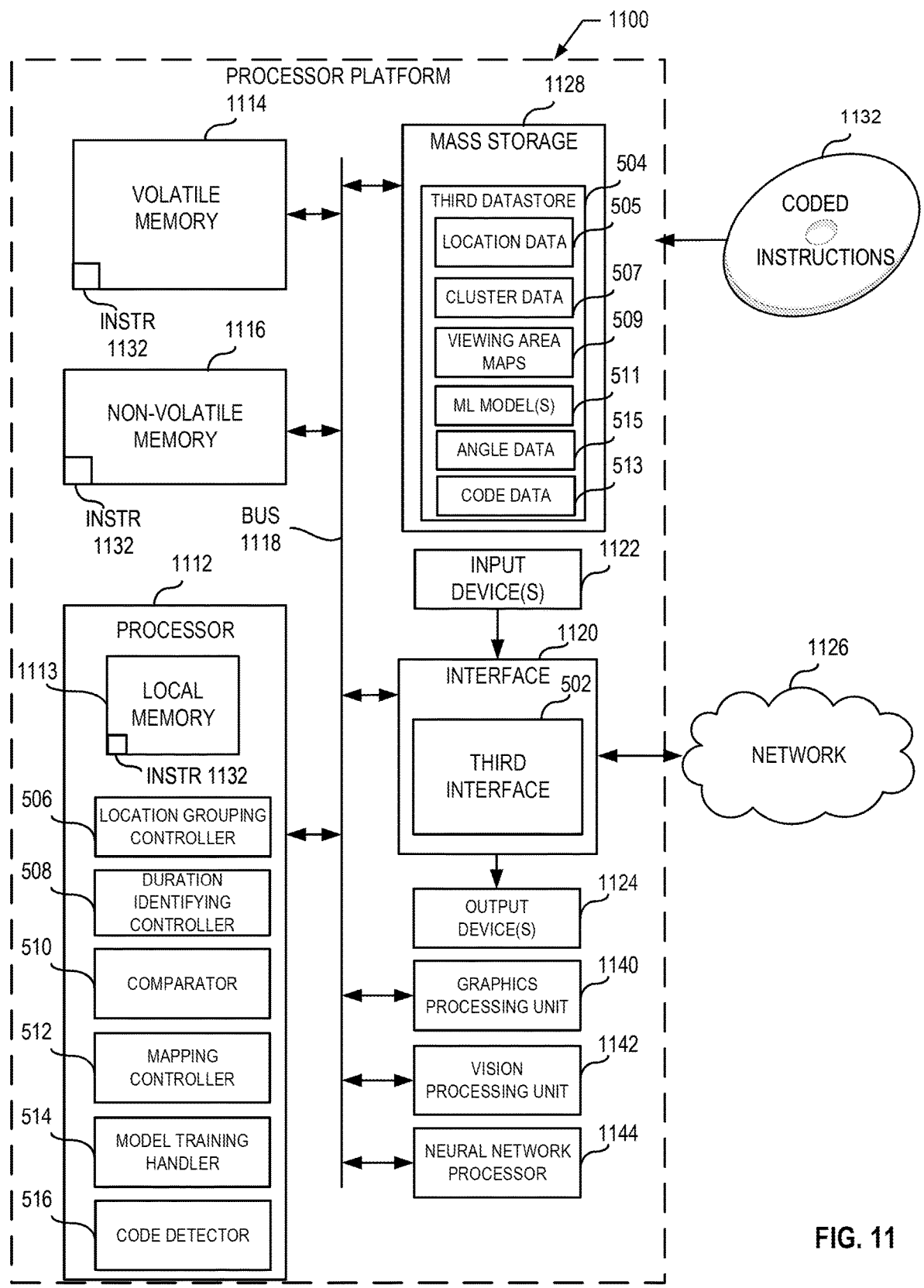
FIG. 11 is a block diagram of an example processing platform structured to execute the instructions of FIGS. 7 and 8 to implement the central facility of FIGS. 1 and 5.

FIG. 11 is a block diagram of an example processor platform 1100 structured to execute the instructions of FIGS. 7 and 8 to implement the central facility 114 of FIGS. 1 and 5. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example location grouping controller 506, the example duration identifying controller 508, the example comparator 510, the example mapping controller 512, the example model training handler 514, and the example monitored data detector 516 of FIG. 5.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC)

interface, and/or a PCI express interface. In this example, the interface circuit 1120 implements the example third interface 502 of FIG. 5.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In this example, the one or more mass storage devices 1128 implement the example third datastore 504 of FIG. 5, which includes the example location data 505, the example cluster data 507, the example media exposure maps 509, the example ML model(s) 511, the example monitored data 513, and the example angle data 515 of FIG. 5.

The machine executable instructions 1132 of FIGS. 7 and 8 may be stored in the mass storage device 1128, in the volatile memory 1114, in the non-volatile memory 1116, and/or on a removable non-transitory computer readable storage medium such as a CD or DVD.

The processor platform 1100 of the illustrated example of FIG. 11 includes an example graphics processing unit (GPU) 1140, an example vision processing unit (VPU) 1142, and an example neural network processor 1144. In this example, the GPU 1140, the VPU 1142, and the neural network processor 1144 are in communication with different hardware of the processor platform 1100, such as the volatile memory 1114, the non-volatile memory 1116, etc., via the bus 1118. In this example, the neural network processor 1144 may be implemented by one or more integrated circuits, logic circuits, microprocessors, GPUs, DSPs, or controllers from any desired family or manufacturer that can be used to execute an AI model, such as a neural network, which may be implemented by the ML model(s) 511. In some examples, one or more of the example location grouping controller 506, the example duration identifying controller 508, the example comparator 510, the example mapping controller 512, the example model training handler 514, and the monitored data detector 516 can be implemented in or with at least one of the GPU 1140, the VPU 1142, or the neural network processor 1144 instead of or in addition to the processor 1112.

Figure 12:
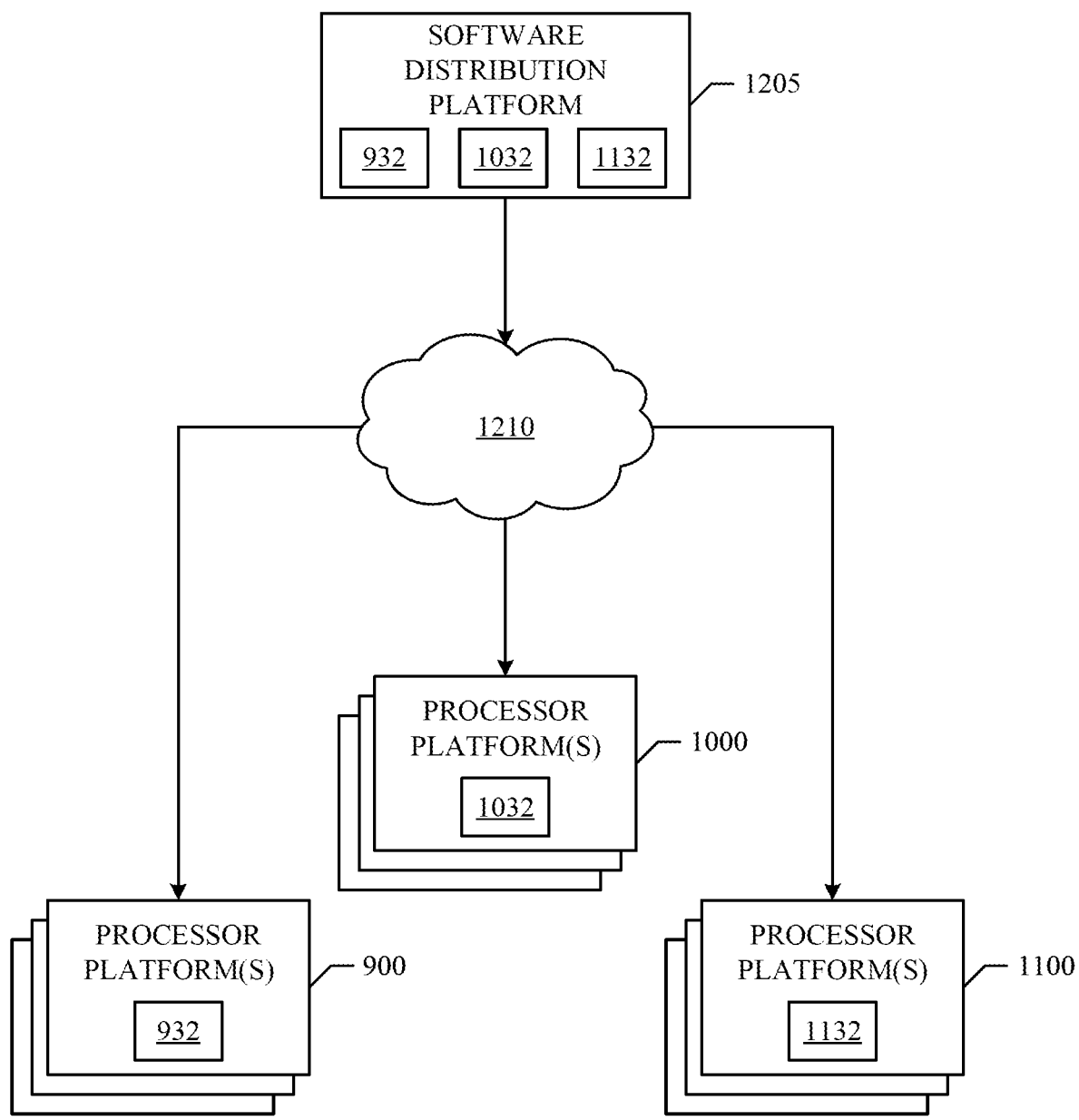
FIG. 12 is a block diagram of an example software distribution platform (e.g., one or more servers) to distribute software (e.g., software corresponding to the example machine readable instructions of FIGS. 4A, 4B, 4C, 7, and 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9, the example machine readable instructions 1032 of FIG. 10, and the example machine readable instructions 1132 of FIG. 11 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9, the example machine readable instructions 1032 of FIG. 10, and the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932 of FIG. 9, the example machine readable instructions 1032 of FIG. 10, and the example machine readable instructions 1132 of FIG. 11, which may correspond to the example machine readable instructions 400A, 400B, 700, and 800 of FIGS. 4A, 4B, 4C, 7, and 8, as described above. The one or more servers of the example software distribution platform 1205 are in communication with a network 1210, which may correspond to any one or more of the Internet and/or any of the example networks 118 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932, the example machine readable instructions 1032, and/or the example machine readable instructions 1132 from the software distribution platform 1205. For example, the software, which may correspond to the example machine readable instructions 400A of FIGS. 4A and 4B may be downloaded to the example processor platform 900, which is to execute the machine readable instructions 932 to implement the device meter 102. For example, the software, which may correspond to the example machine readable instructions 400B of FIG. 4C may be downloaded to the example processor platform 1000, which is to execute the machine readable instructions 1032 to implement the personal meter 126. For example, the software, which may correspond to the example machine readable instructions 700 and 800 of FIGS. 7 and 8 may be downloaded to the example processor platform 1100, which is to execute the machine readable instructions 1032 to implement the central facility 114. In some example, one or more servers of the software distribution platform 1205 periodically offer, transmit, and/or force updates to the software (e.g., the example machine readable instructions 932 of FIG. 9, the example machine readable instructions 1032 of FIG. 10, and the example machine readable instructions 1132 of FIG. 11) to ensure improvements, patches, updates, etc., are distributed and applied to the software at the end user devices.

From the foregoing, it will be appreciated that example methods, apparatus and articles of manufacture have been disclosed that utilize angle of arrival measurements and angle of departure measurements to generate media exposure maps for a media presentation environment. The media exposure maps are used to accurately credit media to panelists who are in a media exposure area and not moving through, passing through, etc., the media presentation environment. The angle of arrival measurements and angle of departure measurements are utilized to generate location data that can be used for training a machine learning model to predict viewing behavior and/or media exposure behavior for a particular household. The disclosed methods, apparatus and articles of manufacture improve the efficiency of using a computing device by increasing accuracy of location tracking of the computing device and reducing processing power utilized to identify and/or determine where panelists in a media exposure environment are. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
   receiving data packets from a personal meter associated with a user who is exposed to media through a media presentation device at a media exposure measurement location;
   determining a mode of direction finding associated with the data packets;
   determining, based on the mode of direction finding and quadrature signals extracted from the data packets, location data characterizing a location of the personal meter relative to the media presentation device at the media exposure measurement location; and
   storing the location data with corresponding location timestamps.

2. The method of claim 1, wherein the location data specifies angle measurements between the personal meter and the media presentation device, and wherein the method further comprises:
   generating a media exposure map based on the angle measurements.

3. The method of claim 1, further comprising:
   receiving media exposure data associated with the media presentation device at the media exposure measurement location for a media exposure time interval that corresponds to the location timestamps; and
   storing the location data in association with the media exposure data.

4. The method of claim 1, wherein determining the mode of direction finding associated with the data packets comprises:
   analyzing information elements associated with the data packets to determine if the data packets are indicative of an angle-of-arrival direction finding mode or an angle-of-departure direction finding mode.

5. The method of claim 1, wherein determining, based on the mode of direction finding and the quadrature signals extracted from the data packets, the location data characterizing the location of the personal meter relative to the media presentation device at the media exposure measurement location comprises:
   extracting the quadrature signals from the data packets;
   based on the quadrature signals, determining angle measurements comprising an angle of arrival or an angle of departure of the data packets; and
   based on the angle of arrival or the angle of departure of the data packets, determining the location data.

6. The method of claim 5, wherein the quadrature signals are indicative of:
   i) a phase difference in a signal carrying the data packets, or
   ii) propagation delays in the signal carrying the data packets.

7. The method of claim 1, further comprising:
   transmitting the location data with corresponding location timestamps to a remote server.

8. A system comprising:
   a processor; and
   a memory storing instructions that, when executed by the processor, cause the system to perform operations comprising:
   receiving data packets from a personal meter associated with a user who is exposed to media through a media presentation device at a media exposure measurement location;
   determining a mode of direction finding associated with the data packets;
   determining, based on the mode of direction finding and quadrature signals extracted from the data packets, location data characterizing a location of the personal meter relative to the media presentation device at the media exposure measurement location; and
   storing the location data with corresponding location timestamps.

9. The system of claim 8, wherein the location data specifies angle measurements between the personal meter and the media presentation device, and wherein the operations further comprise:
   generating a media exposure map based on the angle measurements.

10. The system of claim 8, wherein the operations further comprise:
    receiving media exposure data associated with the media presentation device at the media exposure measurement location for a media exposure time interval that corresponds to the location timestamps; and
    storing the location data in association with the media exposure data.

11. The system of claim 8, wherein determining the mode of direction finding associated with the data packets comprises:
    analyzing information elements associated with the data packets to determine if the data packets are indicative of an angle-of-arrival direction finding mode or an angle-of-departure direction finding mode.

12. The system of claim 8, wherein determining, based on the mode of direction finding and the quadrature signals extracted from the data packets, the location data characterizing the location of the personal meter relative to the media presentation device at the media exposure measurement location comprises:

extracting the quadrature signals from the data packets;

based on the quadrature signals, determining angle measurements comprising an angle of arrival or an angle of departure of the data packets; and based on the angle of arrival or the angle of departure of the data packets, determining the location data.

13. The system of claim 12, wherein the quadrature signals are indicative of:

i) a phase difference in a signal carrying the data packets, or ii) propagation delays in the signal carrying the data packets.

14. The system of claim 8, wherein the operations further comprise:

transmitting the location data with corresponding location timestamps to a remote server.

15. A non-transitory computer readable storage medium having stored thereon program instructions that, upon execution by a processor, cause performance of operations comprising:

receiving data packets from a personal meter associated with a user who is exposed to media through a media presentation device at a media exposure measurement location;

determining a mode of direction finding associated with the data packets;

determining, based on the mode of direction finding and quadrature signals extracted from the data packets, location data characterizing a location of the personal meter relative to the media presentation device at the media exposure measurement location; and storing the location data with corresponding location timestamps.

16. The non-transitory computer readable storage medium of claim 15, wherein the location data specifies angle measurements between the personal meter and the media presentation device, and wherein the operations further comprise:

generating a media exposure map based on the angle measurements.

17. The non-transitory computer readable storage medium of claim 15, wherein the operations further comprise:

receiving media exposure data associated with the media presentation device at the media exposure measurement location for a media exposure time interval that corresponds to the location timestamps; and storing the location data in association with the media exposure data.

18. The non-transitory computer readable storage medium of claim 15, wherein determining the mode of direction finding associated with the data packets comprises:

analyzing information elements associated with the data packets to determine if the data packets are indicative of an angle-of-arrival direction finding mode or an angle-of-departure direction finding mode.

19. The non-transitory computer readable storage medium of claim 15, wherein determining, based on the mode of direction finding and the quadrature signals extracted from the data packets, the location data characterizing the location of the personal meter relative to the media presentation device at the media exposure measurement location comprises:

extracting the quadrature signals from the data packets;

based on the quadrature signals, determining angle measurements comprising an angle of arrival or an angle of departure of the data packets; and based on the angle of arrival or the angle of departure of the data packets, determining the location data.

20. The non-transitory computer readable storage medium of claim 19, wherein the quadrature signals are indicative of:

i) a phase difference in a signal carrying the data packets, or ii) propagation delays in the signal carrying the data packets.

\* \* \* \* \*